(12) United States Patent
Kusumura et al.

(10) Patent No.: US 9,454,597 B2
(45) Date of Patent: Sep. 27, 2016

(54) DOCUMENT MANAGEMENT AND RETRIEVAL SYSTEM AND DOCUMENT MANAGEMENT AND RETRIEVAL METHOD

(75) Inventors: Yukitaka Kusumura, Tokyo (JP); Toshiyuki Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 474 days.

(21) Appl. No.: 12/741,302

(22) PCT Filed: Nov. 6, 2008

(86) PCT No.: PCT/JP2008/070630
§ 371 (c)(1),
(2), (4) Date: May 4, 2010

(87) PCT Pub. No.: WO2009/063925
PCT Pub. Date: May 22, 2009

(65) Prior Publication Data
US 2010/0281030 A1 Nov. 4, 2010

(30) Foreign Application Priority Data
Nov. 15, 2007 (JP) ................................. 2007-296386

(51) Int. Cl.
*G06F 7/00* (2006.01)
*G06F 17/30* (2006.01)

(52) U.S. Cl.
CPC ... *G06F 17/30616* (2013.01); *G06F 17/30675* (2013.01); *G06F 17/30911* (2013.01); *G06F 17/30929* (2013.01)

(58) Field of Classification Search
CPC .................. G06F 17/30864; G06F 17/30929; G06F 17/30616; G06F 17/30911; G06F 17/30675; G06Q 10/10; G06Q 30/02
USPC ........................................................ 707/736
See application file for complete search history.

(56) References Cited

U.S. PATENT DOCUMENTS

| 5,542,090 A | 7/1996 | Henderson et al. |
| 2002/0120451 A1* | 8/2002 | Kato .................... G10L 15/1822 704/258 |
| 2004/0164989 A1* | 8/2004 | Utsunomiya ....... G06F 21/6254 345/536 |
| 2006/0013473 A1* | 1/2006 | Woodfill et al. .............. 382/154 |
| 2008/0077570 A1* | 3/2008 | Tang ................. G06F 17/30684 |

FOREIGN PATENT DOCUMENTS

| JP | 6-215029 A | 8/1994 |
| JP | 2005-018811 A | 1/2005 |

OTHER PUBLICATIONS

Hugh E. Williams, et al.; "Fast Phrase Querying with Combined Indexes"; ACM Transactions on Information Systems, vol. 22, Issue 4, Oct. 2004, pp. 573-594.
International Search Report issued for International Application No. PCT/JP2008/070630, mail date Feb. 10, 2009.

* cited by examiner

*Primary Examiner* — Azam Cheema
(74) *Attorney, Agent, or Firm* — Arent Fox LLP

(57) ABSTRACT

A document management & retrieval system is configured to: store, for each word in a set of words, appearance positions of the each word in a set of documents as a word index; store, for each tag in a set of tags attached to words, a set of words that appear to a right and left of the each tag, and also store, as a tag LR index, appearance positions of the each tag in a set of documents with a combination of the each tag and a word appearing to its right or a combination of the each tag and a word appearing to its left as a key; and, in a tag search where a query phrase contains words and a tag next to each other, refer to the index with a tag and the word to the right or left of the tag as a key, thereby reducing the size of a document list to be read without needing to have a tag name as a secondary key. A tag is updated by just updating two places in the tag LR index.

15 Claims, 22 Drawing Sheets

```
<DOCUMENT><body text><COMPANY NAME>a b c 産業
</COMPANY NAME>の<PERSON'S NAME>山田太郎
</PERSON'S NAME><NOUN>社長</NOUN>は9月10日、
グループウエアの×××を...</body text></DOCUMENT>
```

| NODE ID | DOCUMENT NUMBER | TEXT | TAG NAME | PATH HIERARCHY LAYER |
|---|---|---|---|---|
| 001 | 333 | null | COMPANY NAME | 1.1.1 |
| 002 | 333 | "a b c 産業" | #text | 1.1.1.1 |
| 003 | 333 | "の" | #text | 1.1.2 |
| 004 | 333 | null | PERSON'S NAME | 1.1.3 |

(a) WORD → FREQUENCY, DOCUMENT NUMBER (APPEARANCE POSITION)
(b) TAG NAME → FREQUENCY, DOCUMENT NUMBER (START POINT: END POINT...)...
FIG. 7
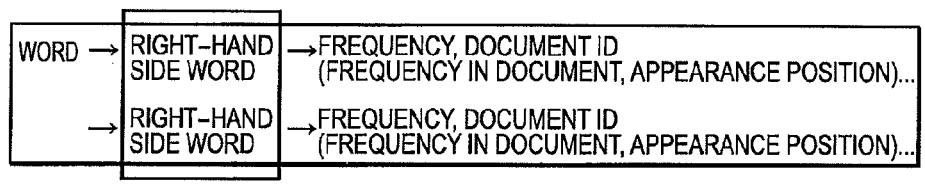
FIG. 8
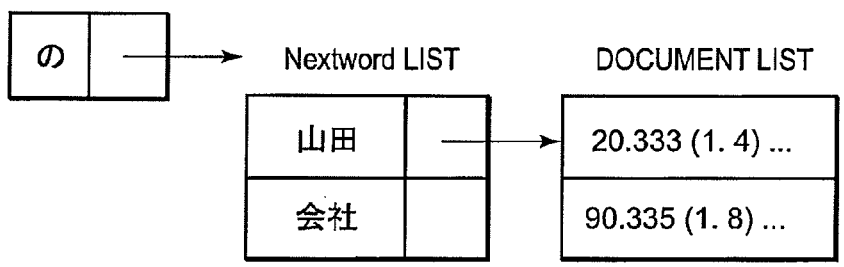
ａｂｃ産業の山田太郎社長は
(TARO YAMADA, THE PRESIDENT OF abc INDUSTRY)
FIG. 9

山田 → 2, 3 3 3 ( 1, 7 ), 3 4 6 ( 2, 4, 20 )

| 2-GRAM ITEM | TAG NAME STRING |
|---|---|
| a b | COMPANY NAME |
| b c | COMPANY NAME |
| c産 | COMPANY NAME |
| 産業 | COMPANY NAME, NOUN |
| の | JYOSHI: PARTICLE IN JAPANESE GRAMMAR, PERSON'S NAME |
| 山田 | PERSON'S NAME, PLACE NAME |
| 田太 | PERSON'S NAME |
| 太郎 | PERSON'S NAME, PLACE NAME |
| 最近 | NOUN |

FIG. 15

| REFERENCE DESTINATION | POSITION NUMBER | REFERENCE KEY |
|---|---|---|
| TR | 1 | [COMPANY NAME] → の |
| TL | 3 | [PERSON'S NAME] → の |

FIG. 16

| POSITION NUMBER | REFERENCE KEY | DOCUMENT LIST |
|---|---|---|
| 1 | [COMPANY NAME] → の | 8 7 6 3 , 3 3 3 ( 1 , 1 : 5 )... |
| 3 | [PERSON'S NAME] → の | 5 6 4 , 3 3 3 ( 1 , 7 : 10 )... |

FIG. 17

KEY STRING

| POSITION | 1 | 2 | 3 | 4 |
|---|---|---|---|---|
| WORD KEY | a b c 産業 | の | — | 社長 |
| TAG KEY | COMPANY NAME | — | PERSON'S NAME | — |

| POSITION KEY | i-1 | i | i+1 |
|---|---|---|---|
| WORD KEY | A | B | |
| TAG KEY | | | |

CASE A
NO INQUIRY HAS i-TH KEY AS PRIMARY KEY

| POSITION KEY | i-1 | i | i+1 |
|---|---|---|---|
| WORD KEY | A | B | |
| TAG KEY | | | C |

CASE B
TAG KEY INQUIRY ONLY

| POSITION KEY | i-1 | i | i+1 |
|---|---|---|---|
| WORD KEY | A | B | C |
| TAG KEY | | | |

CASE C
WORD KEY INQUIRY ALONE

| POSITION KEY | i-1 | i | i+1 |
|---|---|---|---|
| WORD KEY | A | B | D |
| TAG KEY | | C | |

CASE D
TAG KEY INQUIRY AND WORD KEY INQUIRY

FIG. 23

| WORD | APPEARANCE POSITION | DOCUMENT NUMBER |
|---|---|---|
| ａｂｃ産業 | 1 | 3 3 3 |
| の | 6 | 3 3 3 |
| 山田 | 7 | 3 3 3 |
| 太郎 | 9 | 3 3 3 |
| 社長 | 11 | 3 3 3 |
| ... | ... | ... |

KEY STRING

| POSITION | 1 | 2 | 3 |
|---|---|---|---|
| WORD KEY | | の | |
| TAG KEY | COMPANY NAME | | PERSON'S NAME |

| KEY | BIT STRING |
|---|---|
| は | 1 1 1 1 0 1 1 1 1 1 1 1 |
| の | 1 1 1 1 1 1 1 1 1 0 1 1 1 |
| [COMPANY NAME] | 1 1 1 0 1 0 1 0 1 0 1 1 0 |
| [PERSON'S NAME] | 1 1 0 1 1 0 1 1 0 1 1 0 1 |

FIG. 29

TAG NAME → FREQUENCY, DOCUMENT NUMBER
(( START POINT: END POINT, LEFT-HAND SIDE WORD, RIGHT-HAND SIDE WORD )...)...

PERSON'S NAME → 1 0 0 0 0 1 , 3 3 3 (( 7: 10, "の", "社長" )...)...

FIG. 31

| TAG NAME | FREQUENCY | INDEX TYPE |
|---|---|---|
| PERSON'S NAME | 1 0 0 0 1 | NLR |
| COMPANY NAME | 7 5 7 | NLR |
| ... | ... | ... |

FIG. 32

DOCUMENT MANAGEMENT AND RETRIEVAL SYSTEM AND DOCUMENT MANAGEMENT AND RETRIEVAL METHOD

TECHNICAL FIELD

This invention relates to a technology of attaching a tag to a partial character string within a document, and managing and retrieving document information based on the tag. More particularly, this invention relates to a technology of making a phrase that contains a tag usable as a processing request (query) for information retrieval.

BACKGROUND ART

FIG. 2 illustrates an example of a tagged document. The term "writing" herein refers to data that contains at least a document number which is a unique identifier and a character string to be searched (body text). A "tag" refers to data that is attached to one or more words within a document. FIG. 2 illustrates a document example which contains a (Japanese) character string "ＡＢＣ産業の山田太郎社長は・・・" (in English, "Taro Yamada, the president of ABC Industry, . . . "), illustrating an example of a "company name" tag attached to the first to fifth characters "ａｂｃ産業'" and an example of a "person's name" tag attached to the seventh to tenth characters "山田太郎". A character string that describes a tag, such as "company name" and "person's name", is referred to herein as a tag name. A "word" herein refers to a partial character string of body text that is created in accordance with some fixed rule such as morphological analysis or N-gram (in which a character string is broken into N-character fragments).

A document management & retrieval system that performs document management and retrieval on such a tagged document is provided with a function of attaching/detaching a tag to/from a partial character string within a document and a function of searching a document by phrase that uses a tag. The document search by phrase that uses a tag means a function with which a string of sequential characters containing a tag name and a character string is input and a set of documents containing the phrase is output. As an example of the phrase that uses a tag, "[company name] の [person's name] ([person's name] of [company name])" is given. In this syntax, a character string enclosed by "[" and "]" is regarded as a tag name. When regarded as a search query, this phrase means that a document in which an arbitrary word with a "company name" tag attached thereto, a word "の (of)", and an arbitrary word with a "person's name" tag attached thereto appear in succession is to be returned.

As a method of implementing such tag-based document management & retrieval, one is known in which a tagged document is expressed in a description format that has a hierarchical structure, such as Extensible Markup Language (XML), to utilize a hierarchically structured-document search device XML data base (XMLDB) (see, for example, Japanese Unexamined Patent Application Publication (JP-A) No. 2005-18811, which is hereinafter referred to as Patent Document 1).

An example of XML is described with reference to FIGS. 3 to 5. FIG. 3 illustrates an example in which a tagged document is expressed in XML, FIG. 4 expresses a part of this document as a tree structure based on the inclusive relation between tags, and FIG. 5 illustrates a table for managing hierarchical information.

In FIG. 4, elliptic nodes and rectangular leaf nodes signify tags and text items, respectively, and edges between those nodes signify the presence of an inclusive relation between tags or between a tag and a text item. Information called a path hierarchy layer is also written in FIG. 4 under each node. The path hierarchy layer of each node is information indicating the position of the node within the document. Numbers indicating the node position are written along with delimiters (".") as the path hierarchy layer. For example, a path hierarchy layer "1. 1. 3" is attached to a "person's name" node of FIG. 4, which means that this node is "the third node under the first node ("body text" node) under the first node ("document" node)" when viewed from the root.

The hierarchical information is managed in a table as the one illustrated in FIG. 5. This table, however, shows logical relations and the information may be actually expressed with the use of a plurality of tables. In the table illustrated in FIG. 5, node IDs, document numbers, text items, tag names, and path hierarchy information are managed for nodes within a document set. A node ID is an identifier unique among all nodes within the document set. A document number is an ID indicating a document that contains the node in question. A text item is a character string contained in a leaf node and, for a node that is not a leaf node, "NULL" is input. A tag name is the tag name of each node and, for a leaf node, "#text" is input. A path hierarchy layer means the path hierarchy layer of each node.

A method of searching such information is described taking as an example the operation of the search device disclosed in Patent Document 1.

For instance, when a phrase "[company name] の [person's name] ([person's name] of [company name])" is given as a query, the search device first breaks up the query into a plurality of search criteria. This query is broken into three criteria: A) that a "company name" tag is contained; B) that a word "の (of)" is contained; and C) that a "person's name" tag is contained. The search device next refers to the table illustrated in FIG. 5 with each of the criteria as a key, to thereby obtain a list of nodes whose tag name is "company name" (List A), a list of nodes whose text item is "の (of)" (List B), and a list of nodes whose tag name is "person's name" (List C). The search device subsequently compares the nodes on List A, List B, and List C, picks up combinations of nodes that have the same document number, and picks up a combination in which the positional relation of the nodes is such that a "company name" node on List A, a "の (of)" node on List B, and a "person's name" node on List C appear sequentially in the same order as in the query. The positional relation is determined by comparing path hierarchies. In the case of this query, a "company name" node, a "の (of)" node, and a "person's name" node are sibling nodes, and the search device creates a search result from nodes that meet the following three criteria:

Criterion 1) the path hierarchy layer of the "company name" node, the path hierarchy layer of the "の (of)" node, and the path hierarchy layer of the "person's name" node match except their final numbers;

Criterion 2) the final number of the path hierarchy layer of the "の (of)" node equals the final number of the path hierarchy layer of the "company name" node plus 1; and Criterion 3) the final number of the path hierarchy layer of the "person's name" node equals the final number of the path hierarchy layer of the "の (of)" node plus 1.

However, this method has two problems. A first problem is that adding a tag requires an update of the path hierarchy, which prolongs the processing time. FIG. 6 illustrates an example of a change made to the path hierarchy due to the addition of a tag. In FIG. 6, which is about an example of adding a "person's name" tag to a document, the document structure before the addition is illustrated on the left-hand side whereas the document structure after the addition and the range of the resultant path hierarchy update are illustrated on the right-hand side. The update range on the right-hand side shows that the nodes within a range indicated by the dotted line need a path hierarchy update. A change to even a part of a document thus requires great changes in path hierarchy because a path hierarchy uses the overall hierarchical structure of the document to express a node position.

A second problem is that a search takes time when a phrase that consists solely of common terms and frequently appearing tag names is used as a search query. With common terms and frequently appearing tag names as search criteria, a large number of nodes are found in a node search conducted for each of the criteria separately, and the document numbers and positional relations of the large number of nodes have to be checked, which lowers the search speed. For instance, in the case of a query "[company name] の [person's name] ([person's name] of [company name])", the query is broken into a criterion that a "company name" tag should be contained, a criterion that a word "の (of)" should be contained, and a criterion that a "person's name" tag should be contained and, for each criterion, a list of nodes that meet the criterion is created. However, because each criterion is too general, a large number of nodes are found and checking positional relations takes very long.

A document management & retrieval system using XMLDB indexes the hierarchical structure of a document as well and thus takes time to update a tag (addition or removal) or to finish a search. Accordingly, as an alternative method of implementing tag-based phrase search, using an inverted index which is utilized in a full-text search index, instead of indexing the hierarchical structure, is considered.

FIG. 7 illustrates an example of an inverted index. In a data structure indicated by (a) of FIG. 7, inputting a word as a key yields a list holding the number (frequency) of documents that contain the word, the document numbers of the documents that contain the word, and where in the documents the word appears (appearance position, expressed as the number of characters counted from the top of the document) (hereinafter referred to as document list). To accomplish tag-based phrase search with the use of an inverted index, an inverted tag index indicated by (b) is used in addition to the normal inverted index indicated by (a). In the index of (b), as in the case of a word, inputting a tag of a tag name yields a list holding the number (frequency) of documents that contain the tag, the document numbers of the documents that contain the tag, and information indicating where in the documents the tag appears (start point and end point, expressed as the number of characters counted from the top of the document) (hereinafter referred to as tag document list).

Using this index enables attaching or detaching a tag and thus performing a tag update by adding or removing only the relevant part of the inverted tag index.

However, this method, too, has the issue of processing time in a search where the search query used is a phrase that consists only of common terms and frequently appearing tag names. For instance, when a phrase "[company name] の [person's name] ([person's name] of [company name])" is given as a query, a retrieval system that has this index breaks up the query into A) that a "company name" tag is contained, B) that a word "の (of)" is contained, and C) that a "person's name" tag is contained, as the device described in Patent Document 1 does, and refers to each inverted index. As in the case of XMLDB, because each criterion is too general, a very long document list is found for each criterion and checking positional relations takes time.

A method called nextword index is one way to speed up phrase search where the search query consists of common terms by cutting the length of a document list (see H. E. Williams, J. Zobel and D. Bahle, "Fast Phrase Querying with Combined Indexes", ACM Transactions on Information Systems, 22(4), pp. 573-594, 2004, hereinafter referred to as Non-patent Document 1). A nextword index has a data structure in which a document list of a common term high in frequency is broken up based on what word appears next (to the "right" on the premise that the documents are written horizontally).

FIG. 8 illustrates a data structure example of a nextword index. In the nextword index, a word is used as a key, a set of words that appear to the right of the key word (nextwords) is stored, the key word is paired with one of the nextwords to obtain a set of documents in which the two words appear next to each other, and a document list of the set of documents is referred to.

FIG. 9 illustrates an example of an index. In this example, "山田 (Yamada: a surname)" and "会社 (company)" are registered as nextwords of a word "の (of)", and a document list of documents that contain "の山田" and a document list of documents that contain "の会社" are registered for the respective nextwords. In the following description, a key including two words (or criteria) as described above is expressed as "A→B" (for example, "の→"), and A and B are referred to as a primary key and a secondary key, respectively.

A retrieval system disclosed in Non-patent Document 1 improves the search speed by using this nextword index for a word that is high in frequency. For instance, when a phrase "ｂｃ産業の山田 (Yamada of abc Industry)" is input as a search query, and "ａｂｃ産業 (abc Industry)" is a low-frequency word whereas "の (of)" is a high-frequency word, this retrieval system performs a search as follows. First, a normal inverted index is referred to with respect to the low-frequency word to obtain a document list for "ａｂｃ産業". Next, a nextword index is referred to with the use of a key "の→山田" to obtain a document list for the high-frequency word. Those two document lists are compared to output a set of documents that are common to the two and have the same appearance position as in the query. According to nextword index, document lists can thus be read with the adjacency relation between two words as a key, with the result that the search speed is improved.

However, this method is to be used for a simple phrase search and, when tagged documents are the target, has a problem in that tag update processing takes long.

FIG. 10 is a diagram illustrating that tag update processing takes time in a retrieval system that uses a nextword index. Illustrated here is a range in which an update is necessitated when a tag is added to or removed from a phrase "ａｂｃ産業の山田 (Yamada of abc Industry)".

In FIG. 10, (a) illustrates the character string "ａｂｃ産業の山田" with "noun" and "company name" tags attached to "ａｂｃ産業 (abc Industry)", a "jyoshi (translator's comment: jyoshi is a particle in Japanese grammar)" tag attached to "の (of)", and a "person's name" tag attached to "山田 (Yamada)". Eight dotted-line arrows of (a) each signifies an adjacency relation key created in the nextword index. In FIG. 10, "a b c 産業" is low in frequency and stored in a normal inverted index.

Consider a case where a "affiliation" tag is added to the word "の" out of this phrase. This newly generates relations that are indicated by solid-line arrows of (b) and, accordingly, parts corresponding to a key "noun→affiliation", a key "company name→affiliation", a key "affiliation→山田", and a key "affiliation→noun" have to be updated.

Consider another case where the "jyoshi" tag attached to "の" is removed. Then, similarly, relations indicated by solid-line arrows of (c) have to be removed. Specifically, document lists for a key "noun→jyoshi", a key "company name→jyoshi", a key "jyoshi→山田", and a key "jyoshi→proper noun" are referred to, and relevant parts need to be modified.

Nextword index is thus designed without taking into account attaching a tag and, when simply applied to tagged documents, has a problem in that many places need to be updated, thereby prolonging tag update. This is due to the fact that, when a tag is used for a secondary key, reference with respect to a tag is made in a discrete manner.

DISCLOSURE OF THE INVENTION

Problems to be Solved by the Invention

As discussed above, the search device described in Patent Document 1, which takes into account not only phrase search but also a query in the form of a hierarchical tag structure ("return a document that has a '/document/body text/company name' structure" or the like), has a hierarchical index and therefore takes time to update the index. The search device described in Patent Document 1 is also based on a concept that a phrase should be broken into individual words which serve as criteria to search with each criterion separately, and takes long to finish a search when the word criteria are all common patterns and a large amount of information has to be read.

The retrieval system described in Non-patent Document 1 can reduce the size of a document list to be read based on the adjacency relation between two words, but is not designed with tagged documents in mind and consequently takes time to update a tag when applied to tagged documents where the adjacency relations between words and tags are complicated.

This invention has been made to solve those problems, and an object of this invention is to provide a document management & retrieval system and a document management & retrieval method in which an efficient search with a query that includes a common term and a high-frequency tag and an efficient tag update are balanced in a search by phrase that contains a tag.

Means to Solve the Problems

A document management & retrieval system according to this invention includes: a word index storing unit which stores, for each word in a set of words, appearance positions of the each word in a set of documents; a tag LR index storing unit which stores, for each tag in a set of tags attached to words and indicating attributes of the words, a set of words that appear to a right and left of the each tag, and also stores appearance positions of the each tag in a set of documents with a combination of the each tag and a word appearing to its right or a combination of the each tag and a word appearing to its left as a key; a document retrieval unit which receives as a search query an input of a phrase containing a tag and a word, interprets the search query to refer to the tag LR index storing unit by utilizing left-right relations between neighboring words and tags in the phrase, and returns a list of identifiers of documents that contain the phrase; a tag update unit which interprets a query for adding or removing a tag to or from a partial character string in a specific document, and updates what is stored in the tag LR index storing unit; and a document index creating unit which updates an index within the word index storing unit when one or more documents are given.

In this configuration, it is desirable that the document management & retrieval system further include a quick tag value determining unit which uses an arbitrary character string as a key and enables a quick reference to a set of tag names that may be attached to the arbitrary character string, that the tag update unit include means for updating data in the quick tag value determining unit when a tag is to be attached, and that the document retrieval unit include means for, when a phrase where tags appear in succession is input as a search query, referring to the quick tag value determining unit and the tag LR index storing unit to execute an inquiry only for words that may contain a specific tag name.

The document management & retrieval system may further include a bit string storing unit which uses a high-frequency word and a tag name as keys to store a bit string representing a set of documents that contain the high-frequency word and a bit string representing a set of documents that contain a tag, the document index creating unit may include means for updating a bit string in the bit string storing unit when an index is created from a document, the tag update unit may include means for updating a bit string in the bit string storing unit based on a tag that has been added or removed through a tag update, and the document retrieval unit may include means for using a high-frequency word and tag name contained in a query to refer to the bit string storing unit prior to a search and to obtain a set of document numbers of documents that contain all high-frequency words and tag names in the query, to thereby read appearance positions of the phrase in a set of documents after the set of documents is narrowed down based on the document numbers.

The document management & retrieval system may further include: a tag NLR index storing unit which stores, for each tag name in a set of tags, appearance positions of the tag in a set of documents and words to a left and right of the tag, with the each tag name as a key; conversion means which converts an index within the tag NLR index storing unit into an index within the tag LR index storing unit; and management means which changes how an index is stored based on an appearance frequency of the tag.

A document management & retrieval method according to this invention includes: a document index creating step of storing, when one or more documents are given, appearance positions of each word in a set of words that are contained in the one or more documents, with the each word as a key; a tag update step of storing, when a query for adding or removing a tag to or from a partial character string in a specific document is given, appearance positions of the tag, with a tag name as a key; a tag LR storing step of storing, for each tag input in the tag update step, words that appear to a right and left of the each tag, and also storing appearance positions of the each tag within a set of documents with a combination of the each tag and a word appearing to its right, or a combination of the each tag and a word appearing to its left, as a key; and a document retrieval step of interpreting, when a phrase containing a tag and a word is given as a search query, the search query to create a plurality of keys by utilizing left-right relations of neighboring words and tags in the phrase, using the plurality of keys to integrate appearance positions of words which are referred to based on the keys stored in the document index creating step and appearance positions of each tag which are referred to based on the keys stored in the tag update step, and returning a list of identifiers of documents that contain the phrase.

It is desirable that the document management & retrieval method further include a quick tag value determining step of using an arbitrary character string as a key and enables a quick reference to a set of tag names that may be attached to the arbitrary character string, that the tag update step include a step of updating data that represents a relation between a tag name and a character string when a tag is to be attached, and that the document retrieval step include a step of utilizing the quick tag value determining step when a phrase where tag names appear in succession is input as a search query, to read tag appearance positions only for words that may contain a specific tag name.

The document management & retrieval method may further include a bit string storing step of using a high-frequency word and a tag name as keys in the document index step to store a bit string representing a set of documents that contain the high-frequency word and a bit string representing a set of documents that contain a tag, the tag update step may include a step of updating a bit string in a bit string storing unit based on a tag that has been added or removed through a tag update, and the document retrieval step may include a step of referring to bit strings that have been stored in the bit string storing step with a high-frequency word and tag name contained in the search query as keys, obtaining data representing a set of documents that contain all high-frequency words and tags in the search query, and reading word appearance positions and tag appearance positions after a set of documents is narrowed down based on the data.

The tag update step may include a tag NLR index step of storing, for each tag name in a set of tags, appearance positions of the tag in a set of documents and words to a left and right of the tag, with the each tag name as a key, and the tag update step and the document retrieval step may include: a step of selecting a reference destination when an appearance position of a tag is updated or searched for with the tag as a key, depending on whether the tag has been stored in the tag NLR index step or in the tag LR update step; and an index conversion step of deleting data that has been created in the tag NLR index step and newly creating the data in a tag LR index step based on a frequency related to a tag.

This invention can be embodied as a computer program. Specifically, the computer program causes a computer to execute: document index creating processing of storing, when one or more documents are given, appearance positions of each word in a set of words that are contained in the one or more documents, with the each word as a key; tag update processing of storing, when a query for adding or removing a tag to or from a partial character string in a specific document is given, appearance positions of the tag, with a tag name as a key; tag LR storing processing of storing, for each tag input in the tag update processing, words that appear to a right and left of the each tag, and also storing appearance positions of the each tag within a set of documents with a combination of the each tag and a word appearing to its right, or a combination of the each tag and a word appearing to its left, as a key; and document retrieval processing of interpreting, when a phrase containing a tag and a word is given as a search query, the search query to create a plurality of keys by utilizing left-right relations of neighboring words and tags in the phrase, using the plurality of keys to integrate appearance positions of words which are referred to based on the keys stored in the document index creating processing and appearance positions of each tag which are referred to based on the keys stored in the tag update processing, and returning a list of identifiers of documents that contain the phrase.

It is desirable that the computer program further cause the computer to execute: quick tag value determining processing of using an arbitrary character string as a key and making it possible to quickly refer to a set of tag names that may be attached to the character string; in the tag update processing, processing of updating data that represents a relation between a tag name and a character string when a tag is to be attached; and in the document retrieval processing, processing of utilizing the quick tag value determining processing when a phrase where tag names appear in succession is input as a search query, to read tag appearance positions only for words that may contain a specific tag name.

The computer program may further cause the computer to execute: bit string storing processing of using a high-frequency word and a tag name as keys in the document index processing to store a bit string representing a set of documents that contain the high-frequency word and a bit string representing a set of documents that contain a tag; in the tag update processing, processing of updating a bit string stored in the bit string storing processing based on a tag that has been added or removed through a tag update; and in the document retrieval processing, processing of referring to bit strings that have been stored in the bit string storing processing with a high-frequency word and tag name contained in the search query as keys, obtaining data representing a set of documents that contain all high-frequency words and tags in the search query, and reading word appearance positions and tag appearance positions after a set of documents is narrowed down based on the data.

The computer program may further cause the computer to execute: in the tag update processing, tag NLR index processing of storing, for each tag name in a set of tags, appearance positions of the tag in a set of documents and words to a left and right of the tag, with the each tag name as a key; and in the tag update step and the document retrieval step: processing of selecting a reference destination when an appearance position of a tag is updated or searched with the tag as a key, depending on whether the tag has been stored in the tag NLR index processing or in the tag LR update processing; and index conversion processing of deleting data that has been created in the tag NLR index processing and newly creating the data in tag LR index processing based on a frequency related to a tag.

Effect of the Invention

According to this invention, in a search where a query phrase contains words and a tag next to each other, an index is referred to with the word to the right or left of the tag as a key, thereby reducing the size of a document list to be read and executing search processing at high speed. In addition, a tag can be updated merely by adding updates on two sites to the tag LR index storing unit. A tag update can thus be completed quickly through only a small update.

BRIEF DESCRIPTION OF THE DRAWING

FIG. 7 is a diagram illustrating an example of an inverted index.

FIG. 8 is a diagram illustrating a data structure example of a nextword index.

FIG. 9 is a diagram illustrating an example of a nextword index.

FIG. 15 is a diagram illustrating an example of a tag value table.

FIG. 16 is a diagram illustrating an example of an inquiry task list.

FIG. 17 is a diagram illustrating an example of a document list string.

FIG. 23 is a diagram illustrating four cases in key-based inquiry to illustrate positional relation checking processing.

FIG. 29 is a diagram illustrating an example of data that is stored in a bit string storing unit.

FIG. 31 is a diagram illustrating an example of a tag LR document list.

FIG. 32 is a diagram illustrating an example of a management table.

BEST MODE FOR EMBODYING THE INVENTION

The best mode of embodying this invention is described in detail below with reference to the drawings.

First Embodiment

Figure 1:
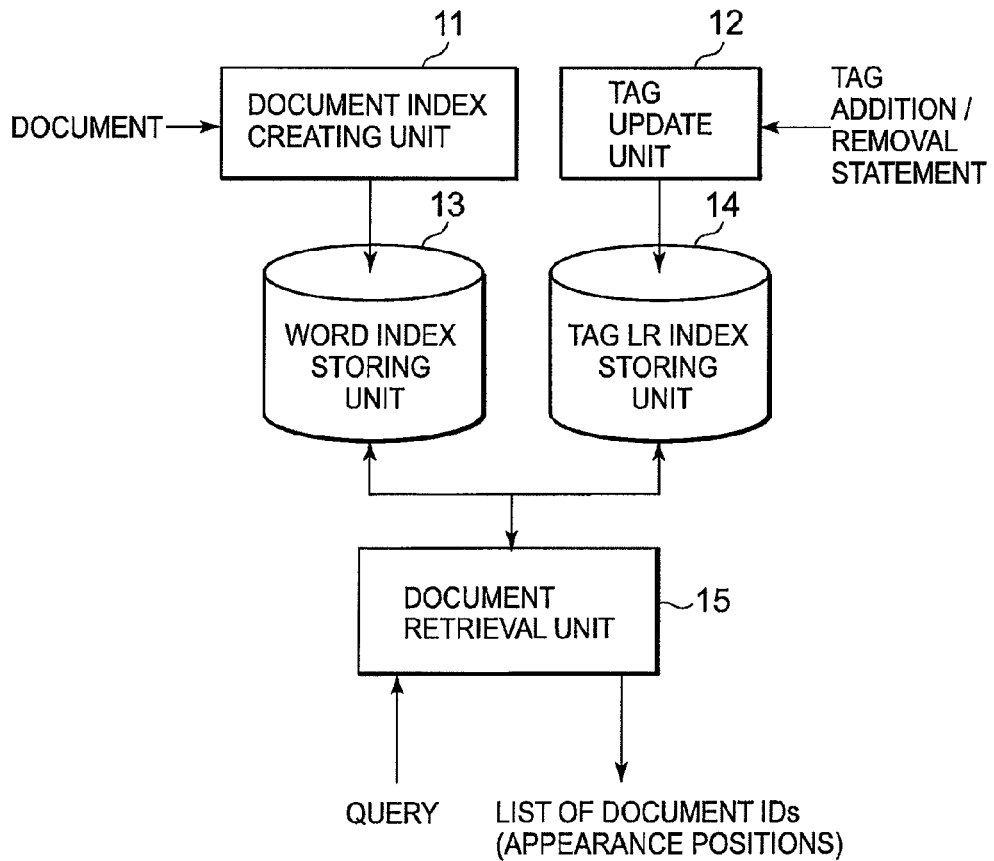
FIG. 1 is a block configuration diagram illustrating a first desirable embodiment of this invention.

FIG. 1 is a block configuration diagram illustrating a first desirable embodiment of this invention and illustrates a configuration example of a document management & retrieval system. This document management & retrieval system includes: a word index storing unit 13 which stores, for each word in a set of words, the appearance position of the word in a set of documents; a tag LR index storing unit 14 which stores, for each tag in a set of tags attached to words to indicate the attributes of the words, a set of words that appear to the left and right of the tag, and also stores the appearance position of the tag in a set of documents with a combination of the tag and the word appearing to its right, or a combination of the tag and the word appearing to its left, as a key; a document retrieval unit 15 which receives an input of a phrase that includes tags and words as a search query, interprets the search query to refer to the tag LR index storing unit 14 utilizing a left-right relation between a word and a tag that are adjacent to each other in the phrase, and returns a list of the identifiers of documents that contain the phrase; a tag update unit 12, which interprets a query for adding or removing a tag to or from a partial character string in a specific document, and updates what is stored in the tag LR index storing unit 14; and a document index creating unit 11 which updates an index within the word index storing unit 13 when one or more documents are given.

The word index storing unit 13 stores an inverted index (denoted by N) for a word. The inverted index means data that enables referring to a set of document numbers and appearance positions with a word as a key, the document numbers being those of documents among a set of documents in which the word appears, the appearance positions being the positions of the word in the documents.

Figures 10, 11:
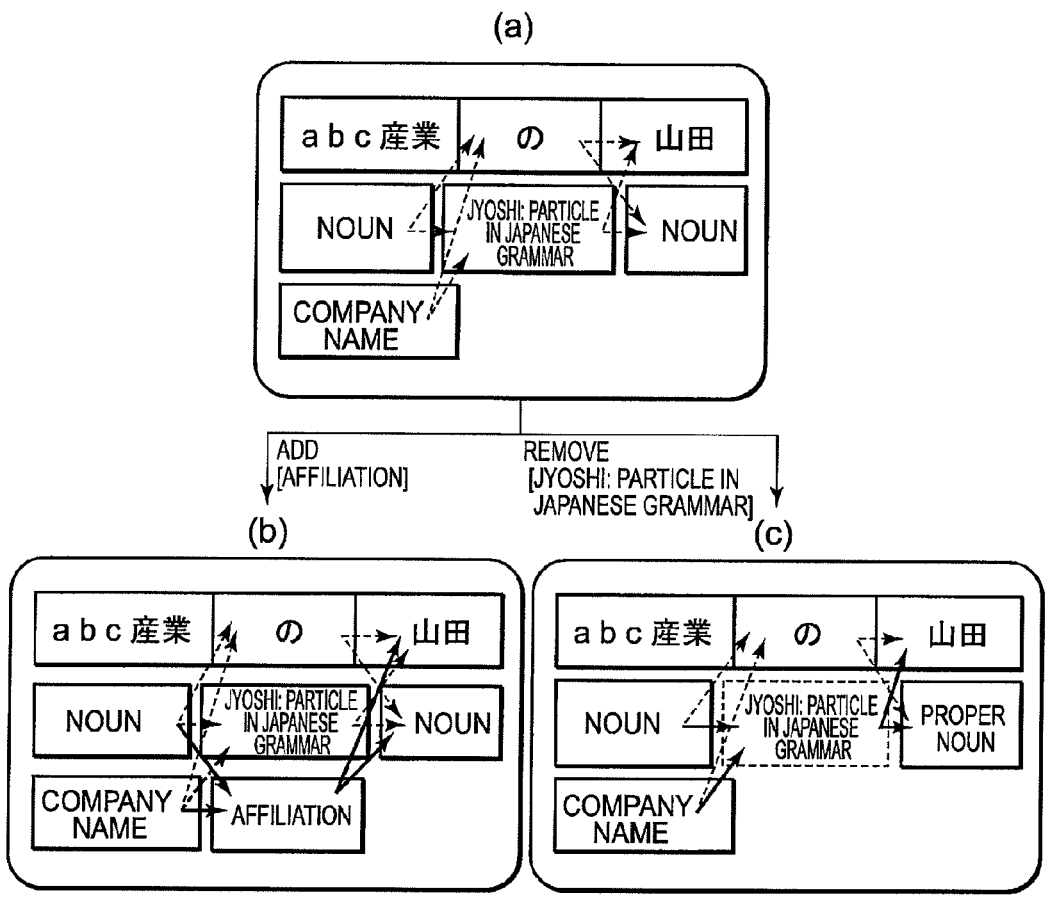
FIG. 10 is a diagram illustrating a range in which an update is necessitated when a tag is added or removed in a retrieval system that uses a nextword index.
FIG. 11 is a diagram illustrating an example of an inverted index that is considered in the first embodiment of this invention.

FIG. 11 illustrates an example of what an inverted index is like in this embodiment. This example shows that a word "山田 (Yamada)" is a key, and that the word "山田" appears twice in a set of documents: once in a document having a document number 333 at the seventh character from the top of the document, and twice in a document having a document number 346 at the fourth character and twentieth character from the top of the document.

The word index storing unit 13 receives from the document index creating unit 11 a set of data that includes a word, the document numbers of documents containing the word, and appearance positions in the documents. The word index storing unit 13 stores the data as document lists having the respective words as keys. The word index storing unit 13 also receives a query that includes at least one word from inquiry executing means 152, and returns a document list of the word.

The tag LR index storing unit 14 stores a tag LR index, which includes a tag L index (TL) and a tag R index (TR), as an inverted index for a tag and words to its left and right. A tag L index of a tag stores a set of words that appear to the left of the tag and tag document lists that have the tag and its left-hand side words as keys. Similarly, a tag R index of a tag stores a set of words that appear to the right of the tag and tag document lists that have the tag and its right-hand side words as keys. A tag document list can thus be fetched with a criterion that a certain tag and a word to its right/left are present.

Figure 12:
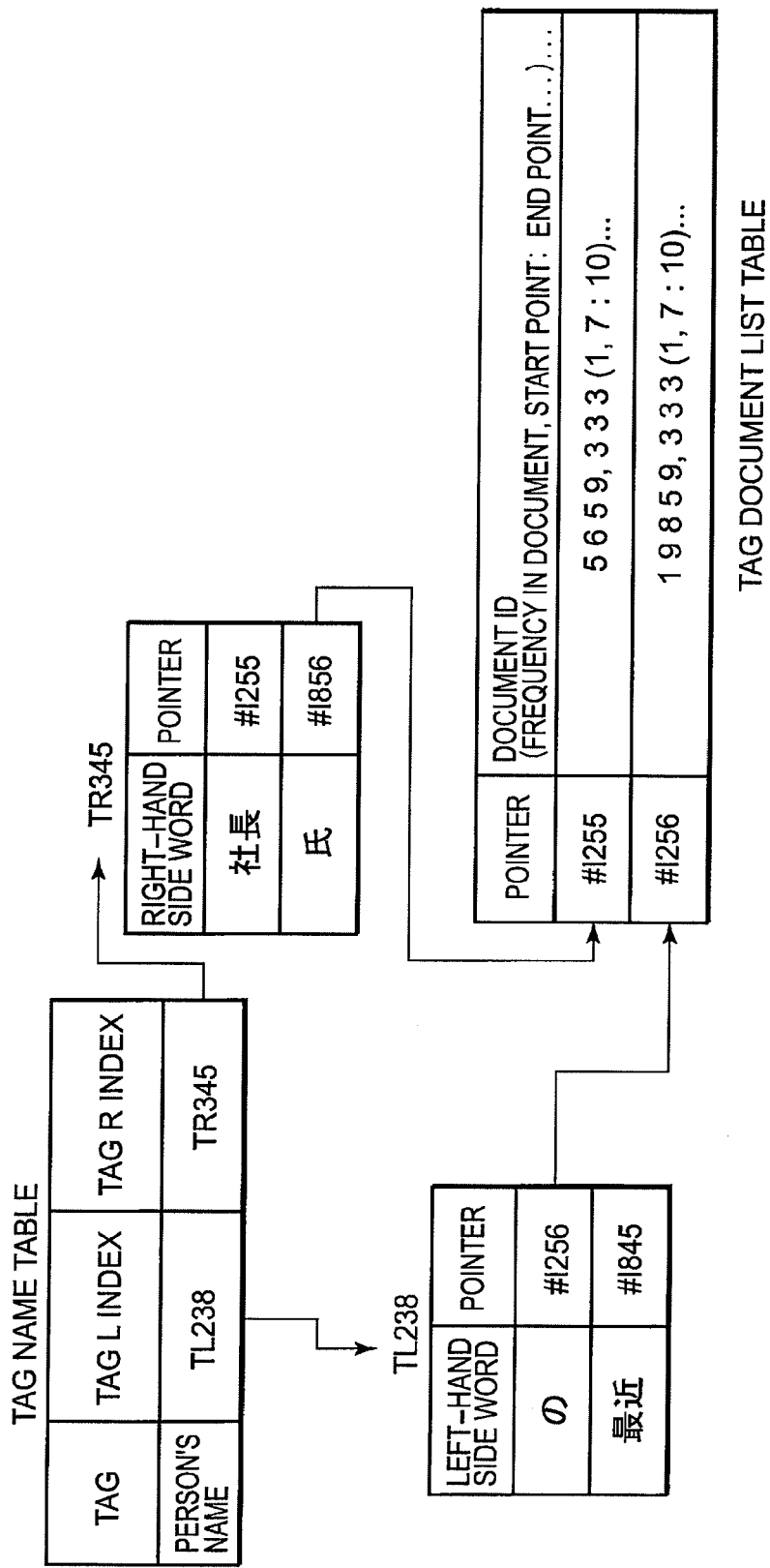
FIG. 12 is a diagram illustrating an example of data in a tag LR index storing unit.

FIG. 12 illustrates an example of a tag LR index. In this example, the tag L index of a [person's name] tag contains a list of left-hand side words "の" and "最近 (lately)", and the tag R index contains a list of right-hand side words "社長 (president)" and "氏 (Mr./Ms.)". Each piece of data in the tag L index and the tag R index is expressed as a reference (pointer) to a tag document list. For example, a tag document list that is associated with "[person's name]→の" is located at a pointer "#I256", this pattern appears 19,859 times in all documents, and, in a document having a document number 333, the [person's name] tag is attached to the seventh to tenth characters from the top of the document.

The tag LR index storing unit 14 receives from the tag update unit 12 data that contains a command type, a tag name, a document number, a start point, an end point, a left-hand side word, and a right-hand side word to update the tag LR index thereinside. The command type is information for distinguishing at least two types, addition/removal. The tag name indicates the name of a tag to be added/removed. The document number is the document number of a document which the tag is added to or removed from. The start point and end point are positions in the document where the tag is added/removed. The left-hand side word is a word that appears to the left of the start point. The right-hand side word is a word that appears to the right of the start point.

The tag LR index storing unit 14 receives an inquiry that includes a reference destination and a reference key from the document retrieval unit 15. The reference destination is data that indicates one of the tag L index and the tag R index. The reference key is specified in the form of "tag name" or "tag name→word". The tag LR index storing unit 14 receives an inquiry through an input of a reference destination and a reference key and, when the reference key is a "tag name", refers to the reference destination tag L index/tag R index based on the tag name to return a relevant left-hand side-word list/right-hand side-word list. When the reference key is in the form of "tag name→word", the reference destination tag L index/tag R index is referred to with the "tag name→word" key and a relevant tag document list is returned.

The document index creating unit 11 is executed by an external program or a user and, when a document set containing one or more documents is given, picks up all words that are contained in the document to input, for each word, in the word index storing unit 13, at least the word, the document number of the document, and an appearance position indicating on what character number counted from the head of the body text of the document the word appears.

The tag update unit 12 is executed by an external program or a user and, in accordance with a statement input about the addition or removal of a tag, updates an index within the tag LR index storing unit 14. The statement concerning the addition or removal of a tag is information including a command type, a tag name, a document number, a start point, an end point, a target word string, a left-hand side word, and a right-hand side word.

The document retrieval unit 15 is executed by an external program or a user, and receives an input of a phrase (search query) that includes one or more tags or words. Based on the input, the document retrieval unit 15 makes an inquiry to the word index storing unit 13, the tag LR index storing unit 14, and a quick tag value determining unit 16 to output as a search result at least a list of document numbers.

In this embodiment, when retrieving a document, an index can be referred to by utilizing the bidirectionality of indices stored in the tag LR index storing unit 14 with respect to a word and a tag that are contained in a search query next to each other. The size of a document list to be read is thus cut without needing to have a tag name as the secondary key, and search processing is accordingly executed at a high speed. In addition, a tag is updated by just updating two places in the tag LR index storing unit 14, and a tag addition/removal can be completed quickly through a small update.

Second Embodiment

Figure 13:
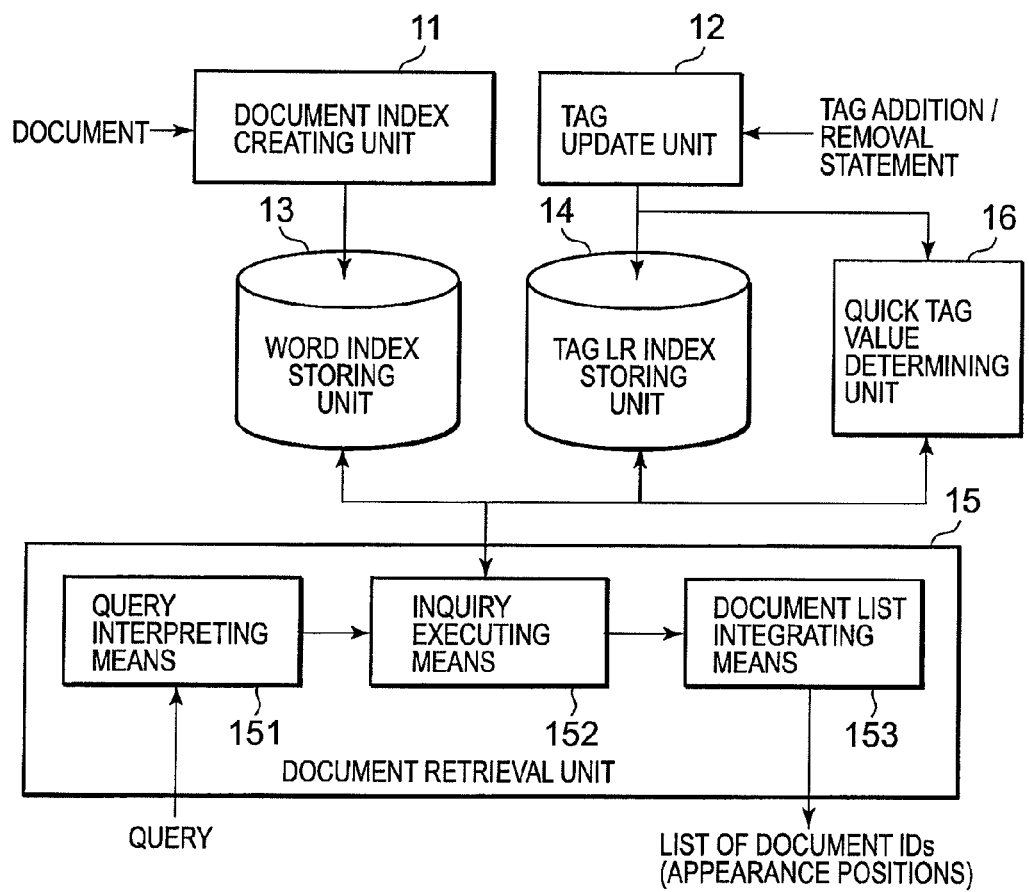
FIG. 13 is a block configuration diagram illustrating a second desirable embodiment of this invention.

FIG. 13 is a block configuration diagram illustrating a second desirable embodiment of this invention and illustrates a configuration example of a document management & retrieval system. This document management & retrieval system differs from the first embodiment in that it is provided with the quick tag value determining unit 16 having a list of tag names that may be attached to an arbitrary character string to make a quick reference to a list of tag names that may be attached to the character string possible. FIG. 13 illustrates details of the document retrieval unit 15. The document retrieval unit 15 includes query interpreting means 151, which interprets a search query and breaks up the search query into a plurality of criteria, the inquiry executing means 152 which makes an inquiry to the word index storing unit 13, the tag LR index storing unit 14, and the quick tag value determining unit 16 based on the plurality of criteria interpreted by the query interpreting means 151, and document list integrating means 153, which compares one or more document lists/tag document lists obtained in the inquiry executing means 152 to one another to integrate the lists into a document list containing only documents that share the same document number and have the same phrase as the search query.

Figure 14:
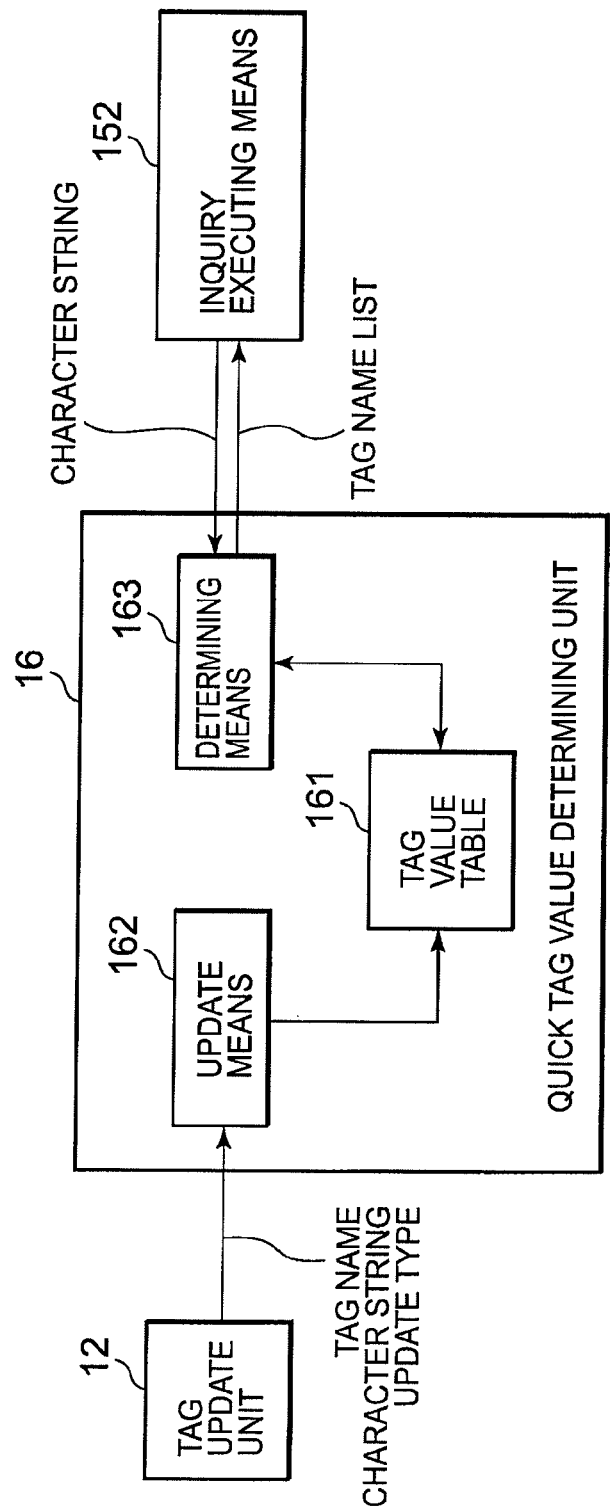
FIG. 14 is a block diagram illustrating a configuration example of a quick tag value determining unit.

FIG. 14 is a block diagram illustrating a configuration example of the quick tag value determining unit 16. The quick tag value determining unit 16 includes therein a tag value table 161, update means 162, and determining means 163. The tag value table 161 is a table that stores a relation between a tag and a word string to which the tag is attached. The update means 162 is called up by the tag update unit 12 to receive an input of a tag name, a target word string (one or more words to be tagged), and a command type (one of addition and removal), and to update relation information in the tag value table 161. The determining means 163 is called up by the inquiry executing means 152 to receive an input of a word string, refer to the tag value table 161, and quickly return a list of tag names that may be attached to the word string.

FIG. 15 illustrates an example of the tag value table 161. As the tag value table 161, one storing a relation between a character string that is created by sectioning a word into two-character fragments (2-gram items) and a list of tag names (tag name string) that may be attached to the 2-gram items is employable. The tag value table 161 can be installed as a program in a memory. The example of FIG. 15 shows that a character string containing "山田 (Yamada)", for instance, has a possibility that a [person's name] tag or a [place name] tag is attached thereto. In this example, a word that is originally a one-character word ("の" and the like) is stored in the tag value table with its one-character word form intact.

The update means 162 sections, with respect to the tag value table 161, a target word string which is input by the tag update unit 12 into 2-gram items and, for each of the 2-gram items, refers to the tag value table 161 and updates an associated tag name string. The determining means 163 sections a character string which is input by the inquiry executing means 152 into 2-gram items, and refers to the tag value table 161 to return a list of tag names that may be attached to the character string.

The query interpreting means 151, the inquiry executing means 152, and the document list integrating means 153 in the document retrieval unit 15 are described.

The query interpreting means 153 is executed by an external program or a user, receives an input of a search query, and outputs a list of inquiry tasks to the inquiry executing means 152. An inquiry task is data including a reference destination, a reference key, and a position number. The reference destination means an index that is referred to upon inquiry, and is one of an inverted index (N) in the word index storing unit 13, a tag L index (TL) in the tag LR index storing unit 14, and a tag R index (TR) in the tag LR index storing unit 14. The reference key is a key for fetching a document list from inside the index, and is one word when the reference destination is N, and a set of a primary key and a secondary key that is expressed by a character string such as "[tag name]→[word]" or "[tag name]→[tag name]" when the reference destination is TL or TR. In this invention, no index has the secondary key that is a tag name, meaning that a tag document list that has a "[tag name]→[tag name]" key cannot be obtained simply, but this is ignored for the time being. The position number indicates the position in a query of the reference key, and is created from a position number within the key string.

FIG. 16 illustrates as an example of an inquiry task list one that is created based on a "[company name] の [person's name] ([person's name] of [company name])" query. In this example, two inquiry tasks have been created which are an inquiry task having "1" as the position number, TR, namely, a tag R index, as the reference destination, and "[company name]→の " as the reference destination, and an inquiry task having "3" as the position number, TL, namely, a tag L index, as the reference destination, and "[person's name]→の " as the reference destination.

The inquiry executing means 152 is called up by the document retrieval unit 15 and receives an input of an inquiry task list. Based on the inquiry task list, the inquiry executing means 152 refers to the word index storing unit 13, the quick tag value determining unit 16, and the tag LR index storing unit 14 to output a document list string to the document list integrating means 153.

FIG. 17 illustrates an example of a document list string. The document list string is information about document list- and tag document list-sets obtained from the word index storing unit 13 and the tag LR index storing unit 14 that associates each document list with an inquiry task. In the example of FIG. 17, for each inquiry task, the position number and reference key of the inquiry task and a document list obtained through the inquiry are associated with one another.

The document list integrating means 153 is called up by the document retrieval unit 15 to receive an input of a document list string and output as a result list a document list that merges those into one.

The flow of processing in this embodiment is described next. The processing in this embodiment has mainly three processes, a search process, a tag update process, and a document index process, which are described below in order.

Figures 18, 19:
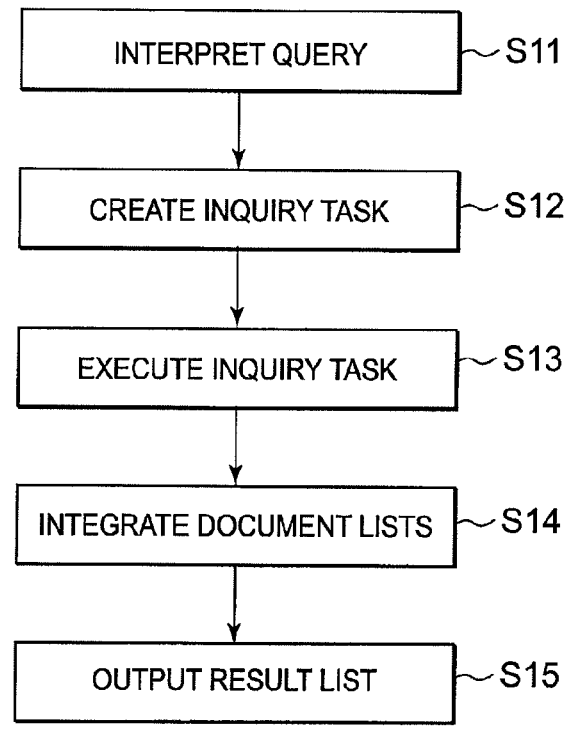
FIG. 18 is a flow chart of processing of a search process.
FIG. 19 is a diagram illustrating an example of a key string.

FIG. 18 illustrates the flow of processing of the search process. The search process is started when a user or an external program inputs a search query to the document retrieval unit 15.

The document retrieval unit 15 first uses the query interpreting means 151 to create a key string from the input search query (S11). This processing is performed with the use of some dictionary or under some rule such as morphological analysis or N-gram. For instance, when the syntax structure of a search query is defined such that a tag is enclosed by "[" and "]" with a tag name or "tag name: character string to which tag is attached" written therein, whereas a part that is not a tag is described in a natural language, this processing is performed as follows.

The query interpreting means 151 first extracts a part of the search query that is enclosed by "[" and "]" to extract a tag name, or a tag name and a character string to which a tag is attached. The query interpreting means 151 next performs morphological analysis and sections the input phrase into words to create a key string. The key string includes a word key string and a tag key string, and a word key represents one word within a phrase. A tag key represents one tag name within a phrase. The word key and the tag key are stored together with a position number that indicates on what number counted from the head the word/tag appears when the phrase is sectioned into words or tags.

FIG. 19 illustrates an example of a key string. The key string illustrated here is created based on a phrase "[company name: a b c 産業 の [person's name] 社長 ]". This query means that a document in which a character string "a b c 産業 (abc Industry)" to which a [company name] tag is attached, a character string "の (of)", an arbitrary character string to which a [person's name] tag is attached, and a character string "社長 (president)" appear in succession is to be returned. In FIG. 19, the word "a b c a b c 産業 " and the [company name] tag are illustrated at a position 1, the word "の " is illustrated at a position 2, the [person's name] tag is illustrated at a position 3, and the word "社長 " is illustrated at a position 4. A symbol "-" illustrated at other positions signifies that none of the criteria is at the positions.

Next, the query interpreting means 151 creates a list of inquiry tasks (task list) based on the key string (S12). Step S12 is defined in this invention as arbitrary processing of creating an inquiry task based on the following conditions.

[Condition 1] For each tag key in the key string, one or more inquiry tasks having the tag as a primary key are created.

[Condition 2] For each word key in the key string, one or more inquiry tasks whose keys contain the word are created.

[Condition 3] When a word and a tag share the same position, inquiry tasks are created while choosing inquiries to the tag LR index storing unit 14 preferentially.

Figure 20:
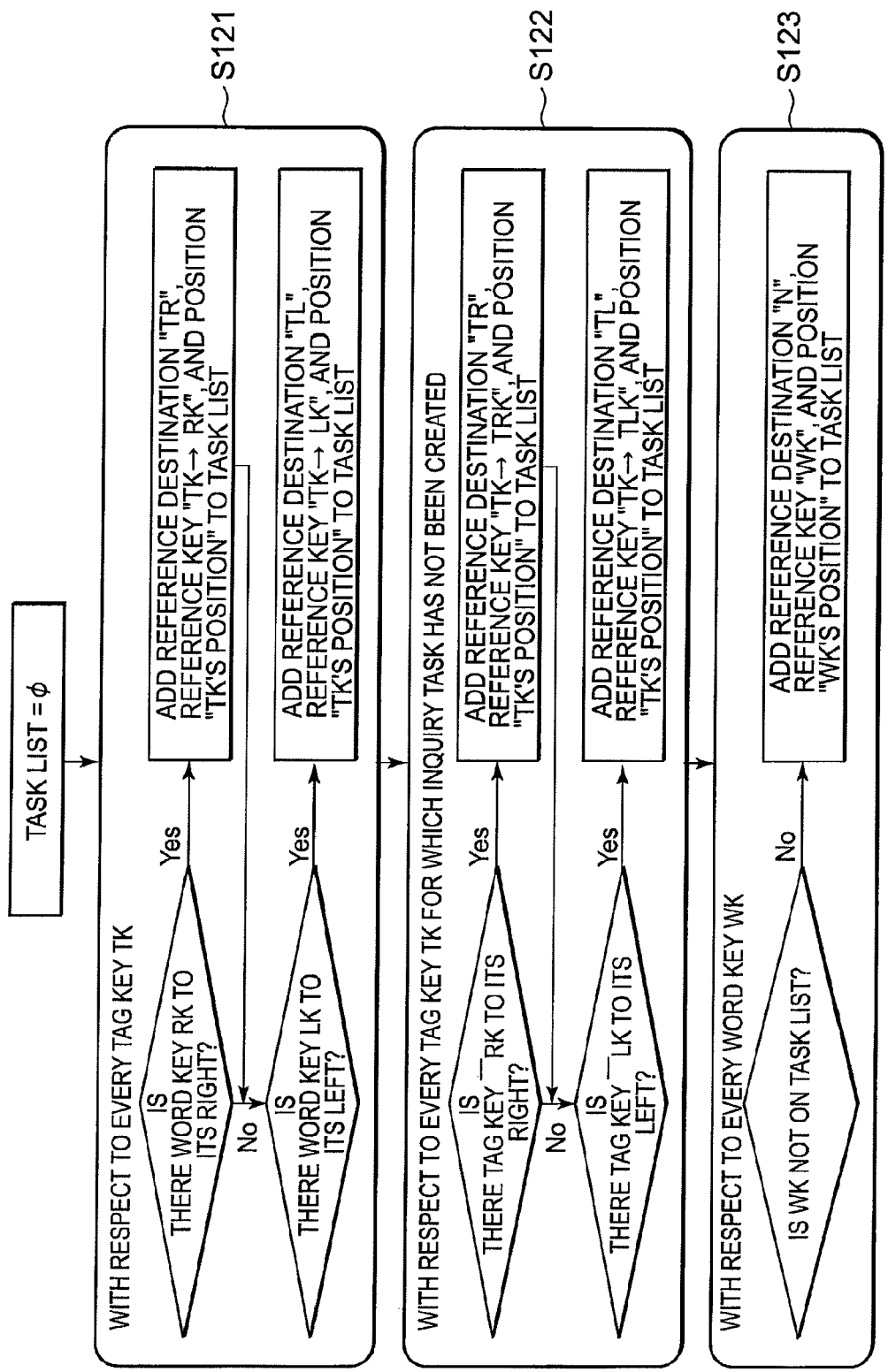
FIG. 20 is a flow chart of processing of creating an inquiry task list.

FIG. 20 is a flow chart of an example of an algorithm that implements the processing of creating an inquiry task list (Step S12 of FIG. 18).

The query interpreting means 151 first creates a task of making an inquiry to the tag LR index storing unit 14 when there are words to the left and right of each tag key in the key string (S121). The query interpreting means 151 examines the key string in order from the left (from the position 1) and checks whether there is a word key to the right of the tag key. When there is, an inquiry task is created which has "TR" as the reference destination, "the tag name of the tag key→its right-hand side word" as the reference key, and "the position number of the tag key" as the position, and then added to the task list. When no word key is present on the right-hand side of the tag key, whether there is a word key to the left of the tag key is checked. In the case where there is, an inquiry task is created which has "TL" as the reference destination, "the tag name of the tag key→its left-hand side word" as the reference key, and "the position number of the tag key" as the position, and then added to the task list.

The query interpreting means 151 next picks up a tag key for which an inquiry task has not been created, and creates for the tag key an inquiry task in which tags are coupled (S122). The query interpreting means 151 examines the key string in order from the left (from the position 1) and, coming across a tag key that is the primary key in none of inquiry tasks that have been created, checks whether there is a tag key to the right of this tag key. In the case where there is, an inquiry task is created which has "TR" as the reference destination, "the tag name of the tag key→the tag name of the right-hand side tag key" as the reference key, and "the position number of the tag key" as the position, and then added to the task list. When no word key is present on the right-hand side of the tag key, whether there is a word key to the left of the tag key is checked. In the case where there is, an inquiry task is created which has "TL" as the reference destination, "the tag name of the tag key→the tag name of the left-hand side tag key" as the reference key, and "the position number of the tag key" as the position, and then added to the task list.

Lastly, the query interpreting means 151 picks up a word key for which no inquiry task has been created, and creates an inquiry task for the word key (S123). The query interpreting means 151 examines the key string in order from the left (from the position 1) and, coming across a word key that is the primary key or the secondary key in none of inquiry tasks that have been created, creates an inquiry task which has "N" as the reference destination, "the word" as the reference key, and "the position of the word" as the position, and then adds the inquiry task to the task list.

While the algorithm illustrated in the flow chart of FIG. 20 gives priority to a reference to the right-hand direction (R index), an algorithm that gives priority to a reference to the left-hand direction is also conceivable. In still another conceivable algorithm, when the above-mentioned three conditions are met and a reference can be made to both the left and the right, the frequency at the head of the document list is read based on the reference to the both, and one that has the lower frequency is chosen.

Figure 21:
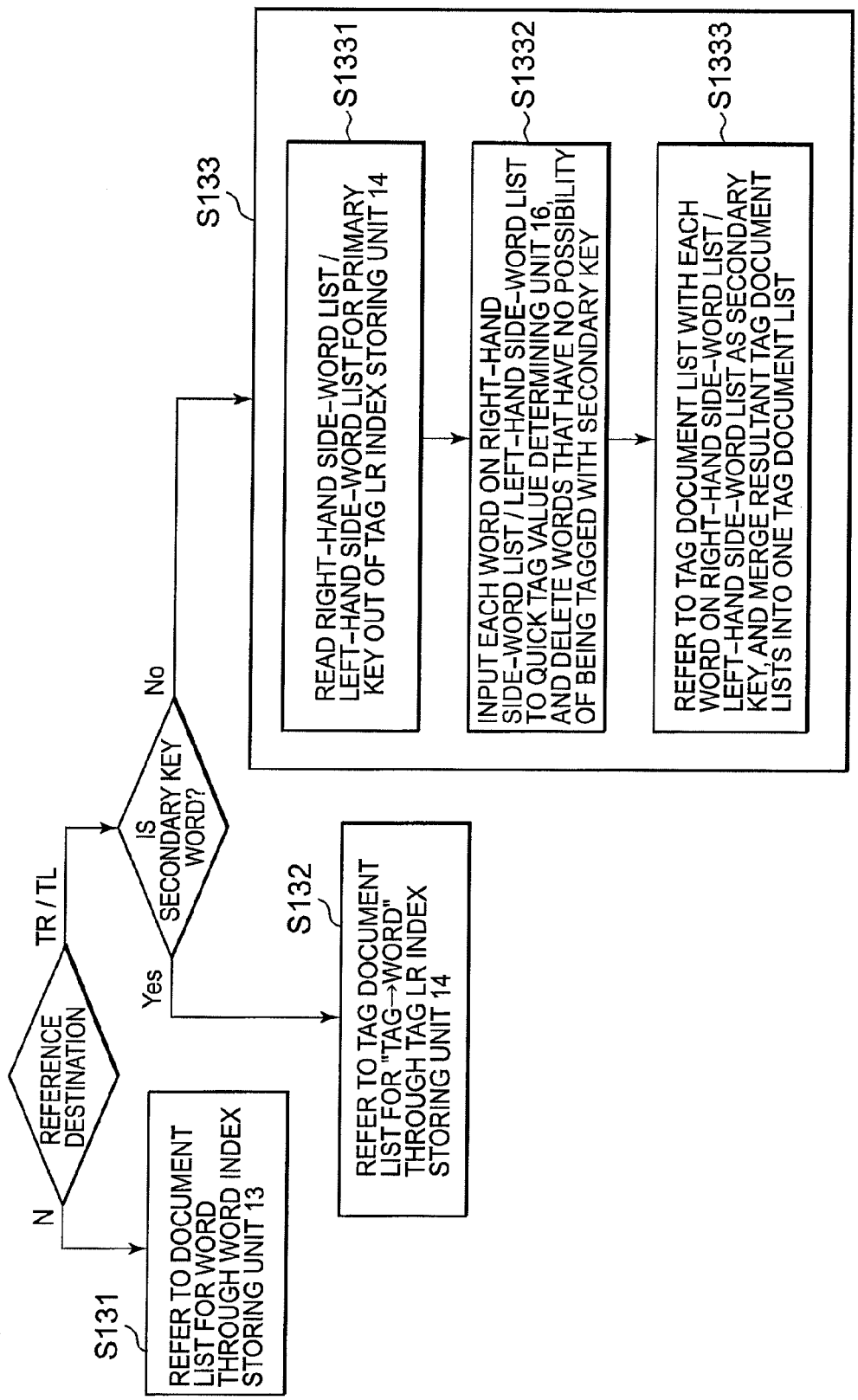
FIG. 21 is a flow chart of inquiry task execution processing.

Next, based on the set of inquiry tasks created by the query interpreting means 151, the inquiry executing means 152 makes an inquiry to each index (S13). FIG. 21 illustrates a flow chart of an example of an algorithm that implements this processing. This processing is performed for each inquiry task created in Step S12.

When an inquiry task has "N" as the reference destination, the inquiry executing means 152 uses the reference key of this inquiry task to examine the word index storing unit 13, reads a relevant document list, and keeps the document list along with the reference key and position information of the inquiry task (S131).

When an inquiry task has "TL" or "TR" as the reference destination, the inquiry executing means 152 checks whether a secondary key in the reference key of this inquiry task is a word or a tag. When the secondary key is a word, an inquiry is made to the tag LR index storing unit 14 with respect to the reference destination and the reference key "tag name→word" and a relevant tag document list is read (S132). When the secondary key in the reference key of the inquiry task is a tag, the inquiry executing means 152 uses the tag LR index storing unit 14 and the quick tag value determining unit 16 to read a tag document list (S133).

The processing of Step S133 is described in more detail. The inquiry executing means 152 first makes an inquiry to the tag LR index storing unit 14 with respect to the reference destination and "the tag name of the primary key" to obtain a left-hand side-word list/right-hand side-word list within the L index/R index (S1331). The inquiry executing means 152 next inputs each word on the right-hand side-word list/left-hand side-word list to the quick tag value determining unit 16 to obtain a tag name string. The inquiry executing means 152 checks whether the tag name string contains the tag name of the secondary key and, when the tag name is not contained, deletes the word from the read right-hand side-word list/left-hand side-word list (S1332).

Next, the inquiry executing means 152 combines the tag name of the primary key with each word on the right-hand side-word list/left-hand side-word list as the secondary key, uses the thus created reference keys to make an inquiry to the tag LR index storing unit 14, and merges a set of tag document lists obtained as a result into a single tag document list.

In the processing of Step S13, the plurality of inquiry tasks can be executed in any order. The processing of Step S13 can be sped up by keeping a document number list DL from the result of one inquiry task and skipping over an appearance position/start point and end point relevant to a document number that is not on DL when reading a document list/tag document list in subsequent inquiry tasks.

The algorithm described here utilizes the quick tag value determining unit 16. This algorithm, if slightly modified, can also be used in cases where the quick tag value determining unit 16 is not provided as in the first embodiment. For instance, the algorithm illustrated in the flow of FIG. 21 may be modified such that, instead of executing Step S1332, a tag document list is read for every word on the right-hand side-word list/left-hand side-word list in Step S1333 with only the tag name of the primary key as a criterion. Further, an inverted index that stores tag document lists having only one tag name as a key may be created in advance, to thereby replace Step S133 with processing of referring to the inverted index with the use of a primary key alone to read a tag document list.

Figure 22:
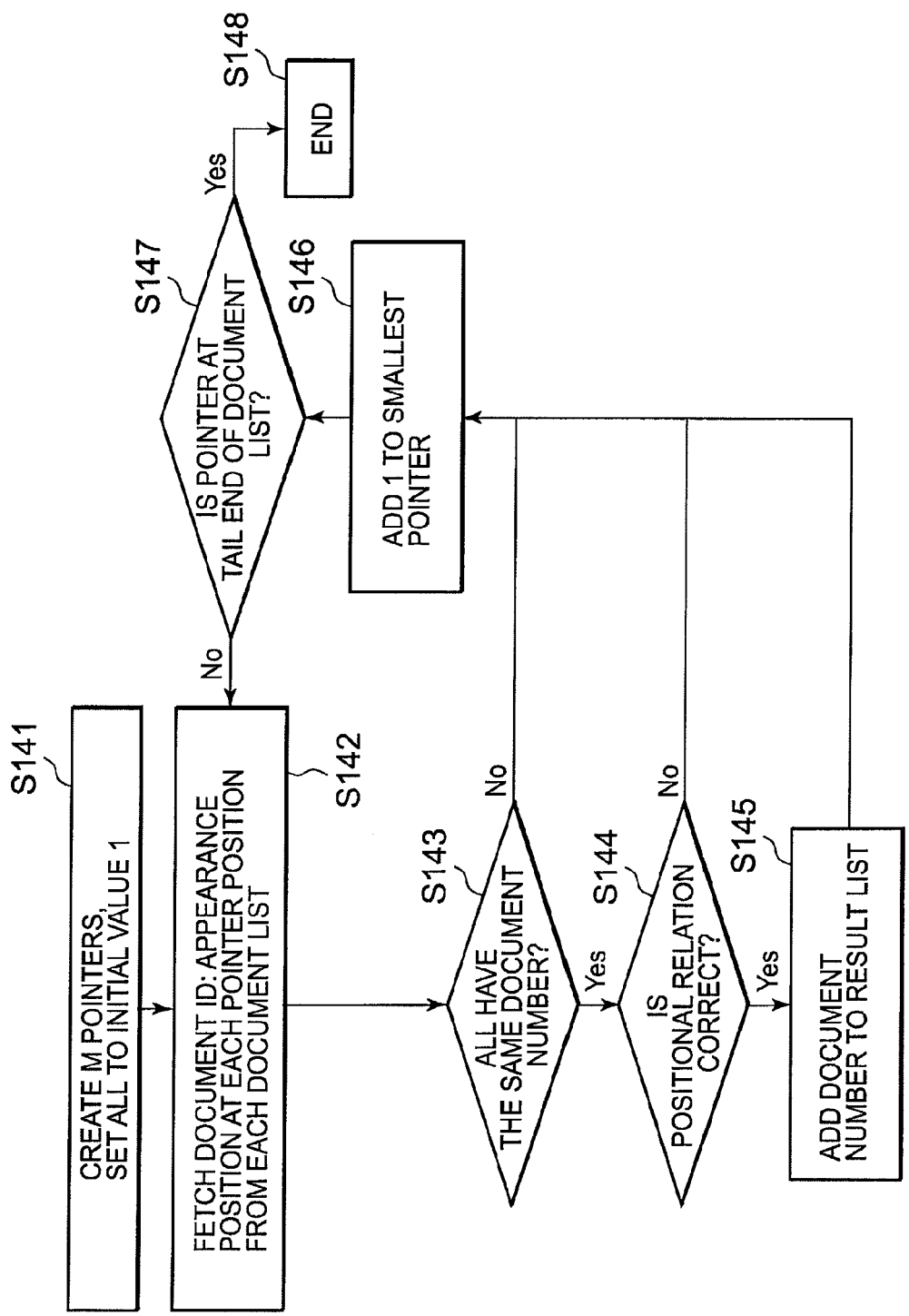
FIG. 22 is a flow chart of document list integration processing.

Next, based on a document list string that includes M document lists/tag document lists obtained by the inquiry executing means 152, the document list integrating means 153 fetches the document number of documents that all share the same document number and that have the same word and tag appearance positions as in the key string (S14). FIG. 22 illustrates a flow chart of an example of an algorithm that implements this processing. The premise of this algorithm is that document lists stored in the word index storing unit 13 and tag document lists stored in the tag LR index storing unit 14 are sorted by document number and appearance position/start point.

The document list integrating means 153 first prepares M integer value pointers, which respectively correspond to the document lists, with all initial values set to 1 (S141). The document list integrating means 153 next fetches from each document list/tag document list an appearance position-document number set/start point and end point-document number set that is found at the pointer number (S142). The document list integrating means 153 next checks whether the M document numbers obtained in Step S142 are all equal (S143) and whether each appearance position matches the adjacency relation of position numbers in the key string (S144). When those conditions are met, the document list integrating means 153 determines the document in question as a hit and adds its document number to an output result list (S145). When they are not, the smallest of the M pointers is increased by 1 (S146) and whether this pointer has reached the tail end of the document list is checked (S147). In the case where the tall end has been reached, the processing is ended (S148). Otherwise, the processing returns to Step S142.

FIG. 23 is a diagram illustrating the algorithm of Step S144. In this algorithm, a key string is examined in order from the left by performing for each key a comparison between an appearance position/start point in a document that is obtained with the key as a primary key and an end point that is obtained from a key to its immediate left, and checking whether the two are adjacent to each other. However, this evaluation method is dependent on how an inquiry is made with respect to an i-th key. Therefore, let us first classify how an inquiry is made with respect to a key at a position i into four cases. FIG. 23 illustrates those four cases through their respective key string examples in which a primary key used for inquiry in the key string in question is represented by a dotted line ellipse and a reference from the primary key to a secondary key is represented by a dotted line arrow.

First, case A is a case in which no inquiry uses the i-th key as a primary key. This is a case where a word key is used as a secondary key as illustrated in the drawing. Case B is a case in which only a tag key is at the i-th position and an inquiry is made with a tag as a primary key.

Accordingly, the position check needs to be performed for inquiries where the primary key is a tag (in this example, "B→A"). Case C is a case in which only a word key is at the i-th position and an inquiry is made with the word key as a primary key. Accordingly, the position check needs to be performed for inquiries that use word keys alone. Case D is a case in which a word key and a tag key are both at the i-th position and separate inquiries are made with the word key and the tag key as primary keys. Accordingly, the positional relation needs to be checked for each of those inquiries separately. This algorithm therefore performs the position check on a case basis.

Figure 24:
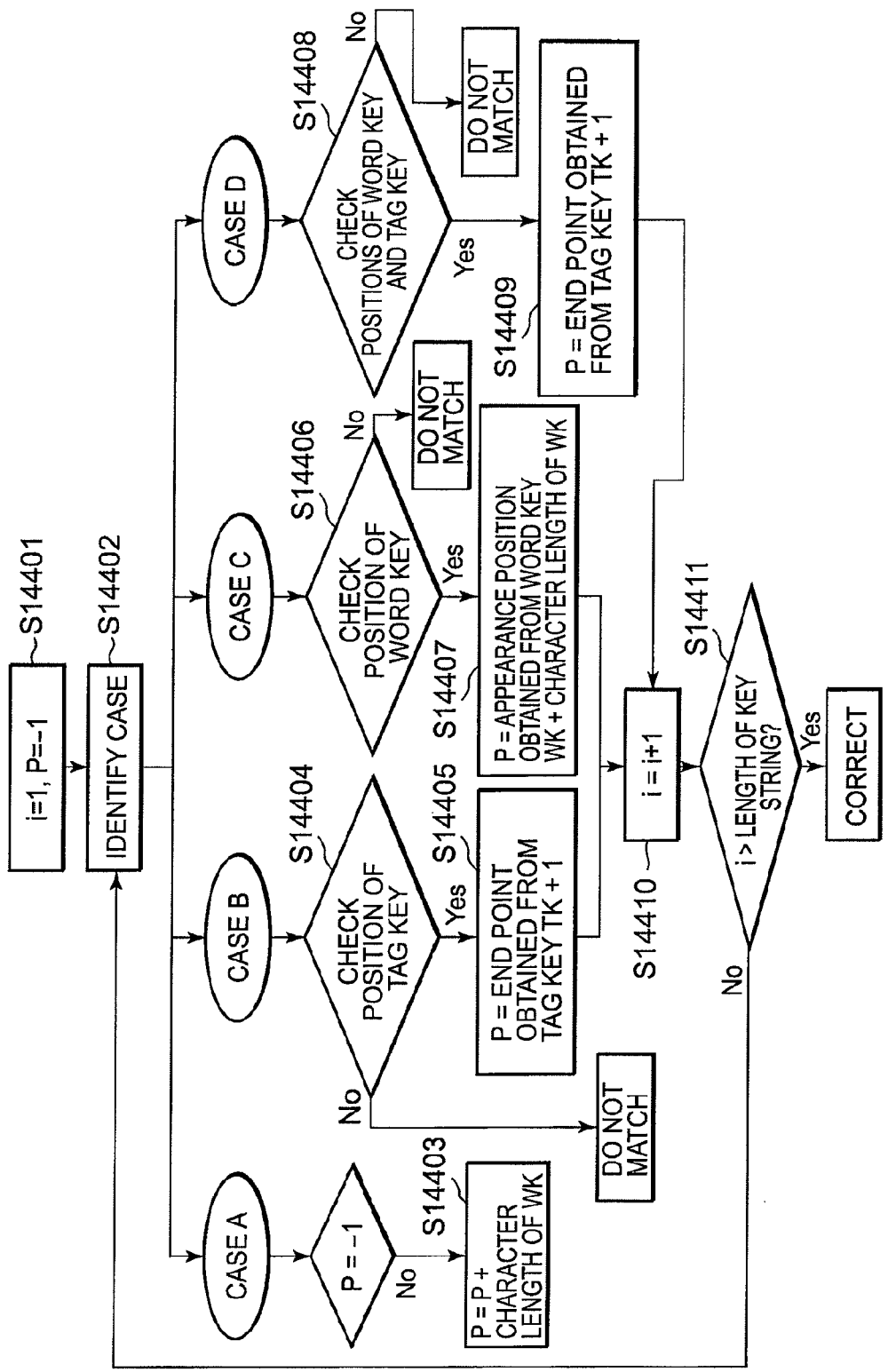
FIG. 24 is a flow chart of the positional relation checking processing.

FIG. 24 is a flow chart illustrating the algorithm of Step S144.

In Step S144, the document list integrating means 153 first initializes two variables i and P to 1 and −1, respectively (S14401). This algorithm is processing of examining a key string in order from the left, and the variable i indicates the position of a currently examined key within the key string. The variable P indicates the appearance position/start point within a document of the key at the i-th position which is expected from a key to the immediate left.

The document list integrating means 153 next determines what inquiry has been made with respect to the i-th key in the key string (S14402). This determination processing is performed by examining the primary key in the reference key of an inquiry task that has a position number "i" and checking whether this primary key is a tag key or a word key. In Case A, the position check is not executed and, unless P has the initial value (−1), the character length of the word key is added to P in preparation for the position check of the next (the (i+1)-th) key (S14403).

In Case B, the position check is performed for the i-th tag key (S14404). The position check for a tag key refers to processing of determining whether the following conditions T1 and T2 are met.

Condition T1. When a plurality of inquiries use the tag key as a primary key, start points as well as end points that are obtained in the respective inquiries match one another.

Condition T2. P is −1 (meaning that the tag key is at the head), or P equals a start point that is obtained with the tag key as a primary key (P is adjacent to an appearance position obtained with the use of a key to its left).

When those are met, it is determined as a match, and an end point that is obtained based on the tag key plus 1 is substituted for P (S14405). Otherwise, it is determined as not a match and the processing of S144 is ended.

In Case C, the position check is performed for the i-th word key (S14406). The position check for a word key refers to processing of determining whether the following condition W is met.

Condition W. P is −1 (meaning that the word key is at the head), or P equals an appearance position that is obtained with the word key as a primary key (P is adjacent to an appearance position obtained with the use of a key to its left). When this is met, it is determined as a match, and an appearance position that is obtained based on the word key plus the character length of the word key is substituted for P (S14407). Otherwise, it is determined as not a match and the processing of S144 is ended.

In Case D, the position check is performed for the i-th word key and tag key (S14408). The position check for a word key and a tag key refers to processing of determining whether the following condition TW is met in addition to all the conditions of Condition T1, Condition T2, and Condition T3.

Condition TW. An end point obtained from an inquiry that uses the tag key as a primary key matches an appearance position obtained from an inquiry that uses the word key as a key plus the character length of the word key.

When those are met, it is determined as a match, and an end point that is obtained based on the tag key plus 1 is substituted for P (S14409). Otherwise, it is determined as not a match and the processing of S144 is ended.

In Step S14411, the document list integrating means 153 adds 1 to i to check whether it exceeds the length of the key string (S14412), and if it does, determines that every positional relation is correct and ends the processing of S144. If it does not, the document list integrating means 153 returns to Step S14402.

Lastly, the document retrieval unit 15 outputs a result list obtained by the document list integrating means 153.

A document index creating process is described next. The document index creating process is put into operation when an external program or a user inputs one or more documents.

Upon input of one or more documents, the document index creating unit 11 reads the body text of each input document, and sections the body text into words with the use of a morphological analysis program or an N-gram program to create a word string. The document index creating unit 11 next examines the word string in order from the front and, for each word, counts the number of characters from the head of the document as an appearance position. The document index creating unit 11 also gives the word index storing unit 13 each word, its document number, and appearance position.

Figures 25, 26, 27:
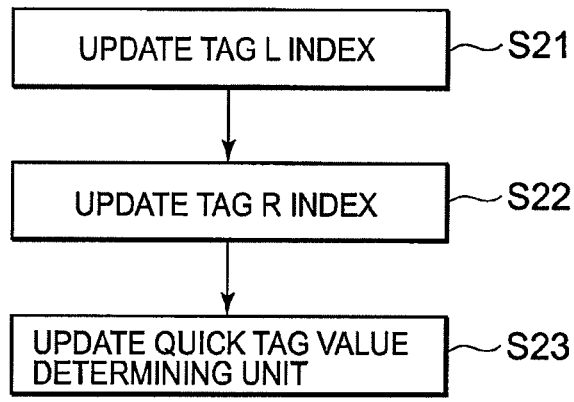
FIG. 25 is a diagram illustrating a tag update process.
FIG. 26 is a diagram illustrating an example of a list of words, document numbers, and appearance positions.
FIG. 27 is a diagram illustrating an example of a key string.

FIG. 25 is a diagram illustrating a tag update process. The tag update process is started when an external program or a user inputs a statement concerning the addition or removal of a tag, calling up the tag update unit 12. A statement concerning the addition or removal of a tag is information including a command type (addition/removal), a tag name, a document number, a start point, an end point, a character string to be tagged (a character string that has been tagged), a word to the left of the tag, and a word to the right of the tag.

Upon input of the statement, the tag update unit 12 refers to the L index within the tag LR index storing unit 14 based on the tag name and the word to the left of the one to be tagged, and updates a relevant tag document list in accordance with the command type (S21). When the command type is addition, the document number, the start point of the tag, and the end point of the tag are added to the relevant tag document list. When the command type is removal, the relevant tag document list is read to look up for a part that has the same document number, start point, and end point as in the statement, and this part is deleted. Similarly, an R index in the tag LR index storing unit 14 is referred to based on the tag name and the word to the right of the one to be tagged, and the document number, the start point of the tag, and the end point of the tag are added or deleted (S22).

The tag update unit 12 next calls up the update means 162 in the quick tag value determining unit 16, and inputs the command type, the tag name, and the character string to be tagged (S23). An example is given, in which the tag value table 161 is the table of FIG. 15 installed as a program in the memory. In this case, when the command type is addition, the update means 162 sections the tagged character string into 2-gram items and refers to the tag value table 161 for each 2-gram item to check whether or not its tag name string contains the input tag name. When the tag name string does not contain the tag name, the tag name is added to the tag name string. When the command type is found to be removal, the update means 162 does nothing. In the case where the quick tag value determining unit 16 is not used as in the first embodiment, the processing of S23 is not executed.

A more detailed description on the operation of the embodiment described above is given through a concrete example.

Figure 2:
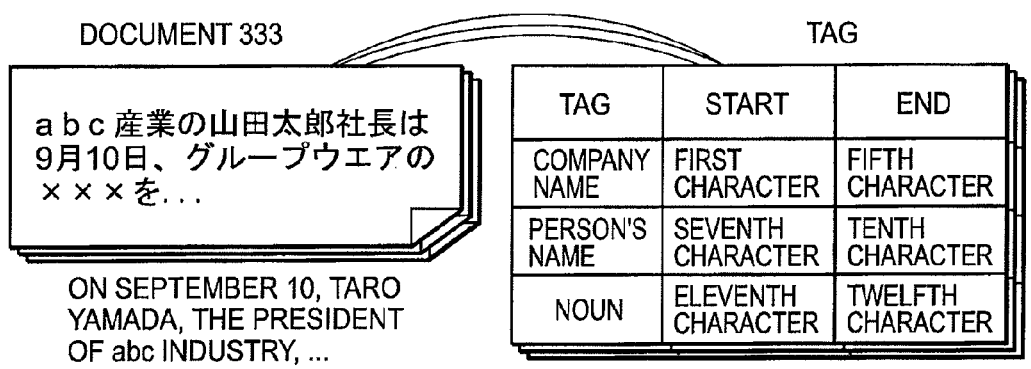
FIG. 2 is a diagram illustrating an example of a tagged document.
Figures 3, 4, 5:
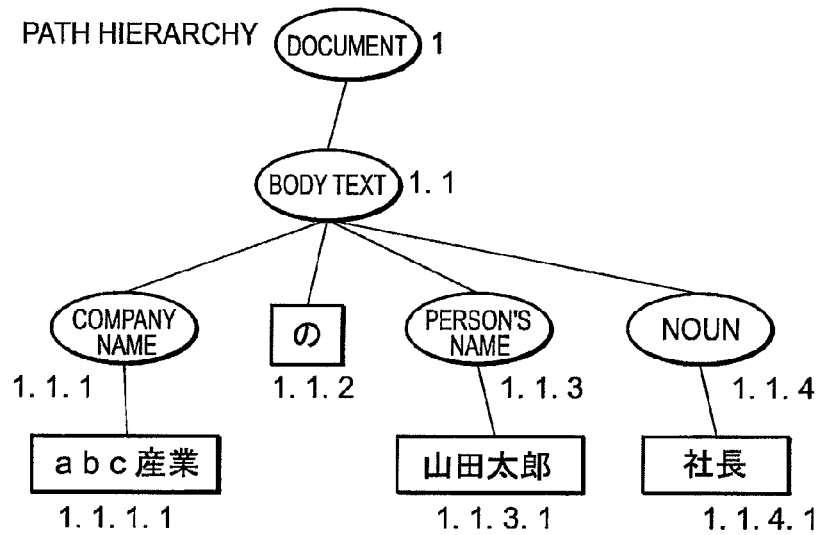
FIG. 3 is a diagram illustrating an example in which a tagged document is expressed in XML.
FIG. 4 is a diagram illustrating a path hierarchy that is used in XMLDB.
FIG. 5 is a diagram illustrating a logical structure of an index that is used in XMLDB.
Figure 6:
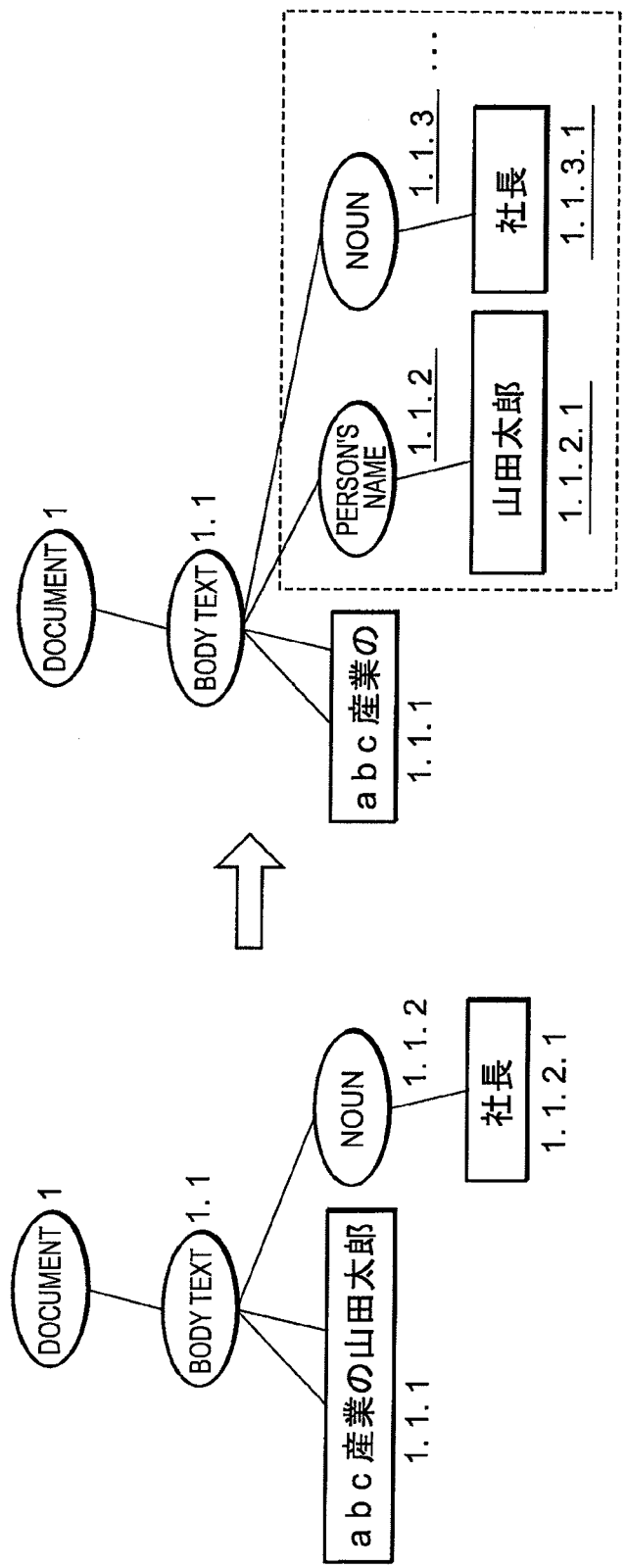
FIG. 6 is a diagram illustrating a range in which an update is necessitated by adding a tag in XMLDB.

The document index creating process is described first. For example, when the document 333 illustrated in FIG. 2 is input to the document index creating unit 11, the document index creating unit 11 separates words in the body text thereof to create a list of words, document numbers, and appearance positions. A part of this list is illustrated in FIG. 26. The document index creating unit 11 next inputs this list to the word index storing unit 13. Based on the list of FIG. 26, the word index storing unit 13 creates an inverted index. An example of a part of this inverted index is illustrated in FIG. 11.

The tag update process is described next. For example, consider a case of attaching a "person's name" tag to two words, "山田 (Yamada: a surname) 太郎 (Taro: a given name)", which are the seventh to tenth characters in the document 333 illustrated in FIG. 2. If a statement has a syntax structure "command type (tag name, document number, start point, end point, target word, left-hand side word, right-hand side word)", a statement input in this example is "ADD ("person's name", 333, 7, 10, "山田太郎", "の", "社長")". "ADD" signifies addition.

The tag update unit 12 then makes an inquiry to the L index in the tag LR index storing unit 14 with the use of a "[person's name]→の" key, and adds a document number "333", a start point "7", and an end point "10" to a relevant tag document list. The tag update unit 12 also makes an inquiry to the R index in the tag LR index storing unit 14 with the use of a "[person's name]→社長" key, and adds a document number "333", a start point "7", and an end point "10" to a relevant tag document list. Data created as a result in the tag LR index storing unit 14 is the one illustrated in FIG. 12.

The tag update unit 12 inputs the tag name [person's name], the character string "太郎", and the command type "ADD" in the statement to the update means 162 in the quick tag value determining unit 16. The update means 162 sections the character string "山田太郎" into two-character fractions to create character strings "山田", "田太", and "太郎". The update means 162 next refers to the tag value table 161 to look up for tag name strings that have "山田", "田太", and "太郎" as keys and, when "person's name" is not contained in the tag name strings, adds "person's name". An example of the tag value table 161 created as a result is illustrated in FIG. 15.

Next, an example of removal is given. A case considered here is similar to the above and a "人名" tag attached to two words, "山田太郎", which are the seventh to tenth characters in the document 333 of FIG. 2, is added. A statement input in this example is "RM ("person's name", 333, 7, 10, "山田太郎", "の", "社長")". "RM" signifies removal.

The tag update unit 12 then makes an inquiry to the L index in the tag LR index storing unit 14 with the use of a "[person's name]→の" key, and reads a relevant tag document list to delete a part that has a document number "333", a start point "7", and an end point "10".

The tag update unit 12 also makes an inquiry to the R index in the tag LR index storing unit 14 with the use of a "[person's name]→社長" key, and deletes a part of a relevant tag document list that has a document number "333", a start point "7", and an end point "10".

The tag update unit 12 inputs the tag name [person's name], the character string "山田", and the command type "RM" in the statement to the update means 162 in the quick tag value determining unit 16. The update means 162 does nothing in this case because the command type is "RM" (removal).

A concrete example of the search process is given next. When the syntax structure of a search query is defined, for example, such that a tag is enclosed by "[" and "]" with a tag name or "tag name: character string to which tag is attached" written therein, whereas a part that is not a tag is described in a natural language, the document retrieval unit 15 operates as follows in response to a query "[company name] の [person's name]".

The query interpreting means 151 first interprets this query and converts the query into a key string illustrated in FIG. 27 (S11). The query interpreting means 151 next performs the processing of Step S121 based on this key string, and creates the inquiry tasks illustrated in FIG. 16 (S12).

The inquiry executing means 152 makes separate inquiries to the tag LR index storing unit 14 about those two tasks, and creates a document list string as the document list string illustrated in FIG. 17.

Based on this document list string, the document list integrating means 153 creates a result list which represents a set of documents that have a matching document number and the same words/tags as in the phrase. This processing is executed as follows.

The document list integrating means 153 first reads tag document lists illustrated in FIG. 17 in order from the head to read out data having a document number "333", a start point "1", and an end point "5" from an inquiry "[company name]→の", and data having a document number "333", a start point "7", and an end point "10" from an inquiry "[person's name]→の" (S142).

The document list integrating means 153 confirms that the document numbers of those pieces of data match (S143), and proceeds to the processing of Step S144. In Step S144, the document list integrating means 153 examines the key string in order from the front. The first item in the key string is a tag key [company name] and there is an inquiry task that has [company name] as a primary key. Accordingly, it is determined as Case B in Step S14402 and the processing of S14404 is executed. Here, the tag key is alone and P has the initial value "−1". The processing of S14405 is therefore executed and P is now 6 (an end point "5" obtained from an inquiry "[company name]→の"+1).

The document list integrating means 153 next reads the second item in the key string. The second item in the key string is "の" and, because there is no inquiry tasks that has "の" as a primary key, it is determined as Case A in Step S14402. The length of "の" which is 1 is added to P, and P is now 7 (S14403).

The document list integrating means 153 next reads the third item in the key string. The third item in the key string is [person's name] and there is a relevant inquiry task. An inquiry with respect to the third tag key [person's name] in the key string is therefore determined as Case B in Step S14402, and P is compared against a start point "7", which is obtained from an inquiry "[person's name]→の" (S14404). Because P is 7 at present, the [company name] tag, "の", and the [person's name] tag are adjacent to one another. The document list integrating means 153 determines through the processing of Steps S14405, S14410, and S14411 that the positional relation is correct, and executes the processing of S145. In S145, the document number "333" is added to the result list.

The document list integrating means 153 keeps performing this processing until the condition of S147 is met, and outputs the ultimately obtained result list (S15).

As another search query example, consider a phrase "[company name] [jyoshi] [person's name]". In the case of this example, the query interpreting means 151 interprets the query (S11), converts the query into a key string, and then creates the following inquiry tasks (S12).

Reference destination "TR", reference key "[company name]→[jyoshi]", position "1".
Reference destination "TR", reference key "[jyoshi]→[person's name]", position "2".
Reference destination "TL", reference key "[person's name]→[jyoshi]", position "3".

In the processing of Step S13, the inquiry executing means 152 makes an inquiry to the tag LR index storing unit 14 with respect to each of the inquiry tasks. Of those inquiry tasks, the inquiry task in which the reference destination is "TL", the reference key is "[person's name]→[jyoshi]", and the position is "3" is described here.

The system first uses [person's name] as a primary key to read "の" and "最近 (lately)" as the left-hand side-word list illustrated in FIG. 13 (S1331). Next, the inquiry executing means 152 makes an inquiry to the quick tag value determining unit 16 about each word to delete a word that has no possibility of "jyoshi" being included. For example, when the tag value table in the quick tag value determining unit 16 is as illustrated in FIG. 15, jyoshi is not included for the word "最近", which is accordingly deleted (S1332). The inquiry executing means 152 next reads a tag document list from the tag L index using the remaining word "の" and based on a reference "[person's name]→[の]" (S1333). The subsequent steps S14 and S15 are the same as in the above-mentioned example, and hence their descriptions are omitted.

In this embodiment, search processing can be executed at a high speed and the addition or removal of a tag can be completed quickly through a small update as in the first embodiment. Further, the system is provided with the quick tag value determining unit 16 which uses an arbitrary character string as a key and enables a quick reference to a set of tag names that may be attached to the character string, and hence the system can conduct a search in which tag document lists are read only for a set of words that appear to the right of a tag A and that have a possibility of being tagged with a tag B adjacent to the tag A. A phrase can thus be referred to at high speed also when a query has neighboring tags.

Third Embodiment

Figure 28:
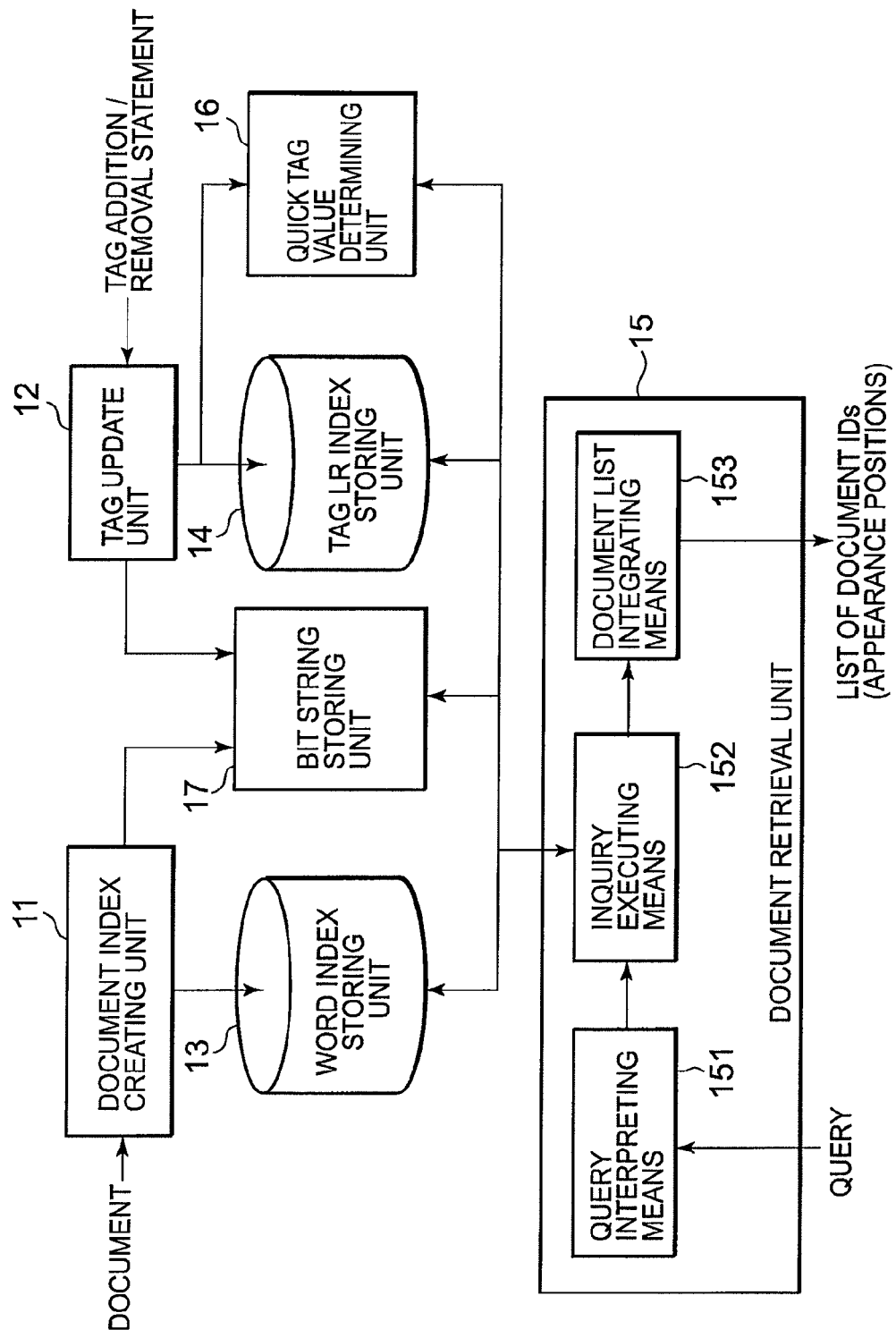
FIG. 28 is a block configuration diagram illustrating a third desirable embodiment of this invention.

FIG. 28 is a block configuration diagram illustrating a third desirable embodiment of this invention and illustrates a configuration example of a document management & retrieval system. This document management & retrieval system includes a bit string storing unit 17 in addition to the configuration of the second embodiment of this invention.

The bit string storing unit 17 stores a relation between a word or a tag name and a bit string indicating which document contains the word or the tag name. The bit string has the same length as that of a set of documents, and each bit corresponds to one of the documents and indicates whether a key is contained in the document (1) or not (0).

FIG. 29 illustrates an example of data stored in the bit string storing unit 17. An N-th bit of this data corresponds to a document number "N", and the data indicates that a word "は (one of jyoshi particles)", for example, is contained in documents having document numbers 1, 2, 3, 4, 6 . . . and that a [person's name] tag is contained in documents having document numbers 1, 2, 4, 5 . . . . While FIG. 29 illustrates a logical relation of data that is managed by the bit string storing unit 17, actual data can be stored in any storage format.

The bit string storing unit 17 receives a word and a document number from the document index creating unit 11 to update a bit string that has the input word as a key. The bit string storing unit 17 also receives a tag name, a document number, and a command type from the tag update unit 12 to update a bit string that is associated with the tag name. The bit string storing unit 17 is called up by the inquiry executing means to receive an input of a word or a tag name and, when there is a key of the word or of the tag name stored inside, returns a relevant bit string.

The search process in this case is executed as follows. The document retrieval unit 15, upon input of a search query, interprets the query through Step S11 of a search process P10, and then makes an inquiry to the bit string storing unit 17 with respect to each word and each tag name contained in the key string to fetch their respective bit strings. The document retrieval unit 15 performs AND operation on the obtained plurality of bit strings, to thereby create a bit string BL, which expresses a set containing all the keys in the key string. The document retrieval unit 15 next performs the processing of S12 to create a set of inquiry tasks and, in S13, makes an inquiry with respect to document lists and tag document lists of the respective inquiry tasks. In reading the document lists/tag document lists (S131, S132, S1333), the document retrieval unit 15 refers to the bit string BL, checks, for each document number on the document lists/tag document lists, a bit corresponding to the document number, and reads an appearance position/start point and end point only when the bit is 1 (when the corresponding document contains all the keys). In S14, the processing of S143 is not executed and, at the fork in S143, the branch to S144 is always taken. The subsequent processing is the same as in the search process in the first and second embodiments.

A tag update process is executed as follows. After finishing the processing of Steps S21 to S23, the tag update unit 12 performs a new step, Step S24, as processing of updating the bit string storing unit 17. Step S24 is processing in which a tag name, a document number, and a command type are input to the bit string storing unit 17 to update a bit string. In Step S24, the bit string storing unit 17 first checks the command type and, when the command type is addition, reads a relevant bit string with the tag name as a key to update a bit that corresponds to the document number to "1". The bit string storing unit 17 does nothing when the command type is removal.

A document update process is executed as follows. After the same document update process as in the first and second embodiments is finished, Step S31 is performed. Step S31 is processing in which the document index creating unit 11 inputs a word and a document number to the bit string storing unit 17. In this processing, the bit string storing unit 17 reads a relevant bit string with the word as a key, and updates a bit that corresponds to the document number to "1".

The processing of Step S31 may be performed only on specific words. For instance, a dictionary HD of words that are high in frequency may be prepared and, prior to the processing of Step S31, compared against the word so that S31 is executed only when the word is contained in HD.

The operation of this embodiment is described next through a concrete example. When a query "[company name] の [person's name]" is input, for instance, the query interpreting means 11 executes the processing of S11 to create a key string that includes keys [company name], "の", and [person's name]. Next, the inquiry executing means 152 refers to data (FIG. 29) stored in the bit string storing unit 17 to read for each key a bit string associated with the key, and performs AND operation. A bit string "1100101000100" is obtained as a result. A set of documents where the three keys [company name], "の", and [person's name] appear is thus narrowed down to documents having document numbers 1, 2, 5 . . . . Then, when reading document lists and tag document lists in Step S13, the inquiry executing means 152 reads only a part that applies to this document set. The subsequent processing is the same as in the document update process in the first and second embodiments.

In this embodiment, the inquiry executing means refers to the bit string storing unit prior to a search with the use of a word/tag name that is contained in a query, to read a bit string and examine the bit string through AND operation. A document containing every word/tag name in the query can thus be found quickly. The size of document lists to be read is therefore reduced and a search can be conducted at an even higher speed.

Fourth Embodiment

Figure 30:
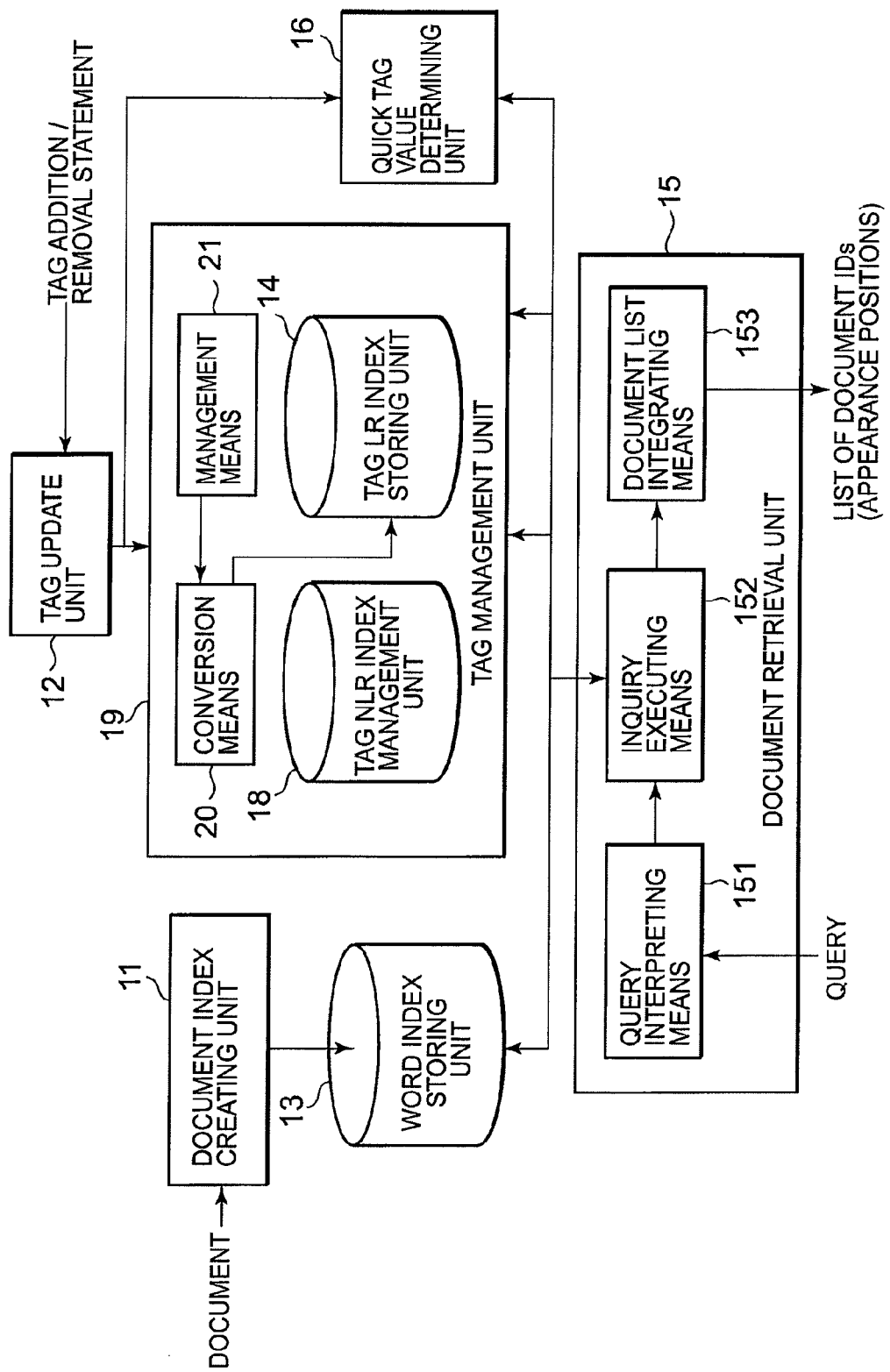
FIG. 30 is a block configuration diagram illustrating a fourth desirable embodiment of this invention.

FIG. 30 is a block configuration diagram illustrating a fourth desirable embodiment of this invention. This document management & retrieval system is provided with a tag management unit 19 which manages tags, and includes within the tag management unit 19 the tag LR index storing unit 14; a tag NLR index storing unit 18 which stores for a set of tags the appearance positions and left-hand side and right-hand side words of the tags in a document set; conversion means 20 which converts an index in the tag NLR index storing unit 18 into an index in the tag LR index storing unit 14; and management means 21 which changes how an index is held based on statistical information of a tag.

The tag management unit 19 receives an inquiry from the inquiry executing means 152, forwards the input data to the management means 21 inside, and returns data that is output from the management means 21 to the inquiry executing means 152. The tag management unit 19 also receives an update statement from the tag update unit 12 and inputs the statement to the management means 21 inside.

The tag NLR index storing unit 18 has therein a tag LR document list, which has each tag name in a set of tags as a key. A tag LR document list is data obtained by adding left-hand side words and right-hand side words to the data of a tag document list.

FIG. 31 illustrates an example of a tag LR document list. This example shows that a [person's name] tag appears 100,001 times within a document set, is located at the seventh to tenth characters in a document whose document number is 333, and has a word "の" to its left and a word "社長" to its right.

The tag LR index storing unit 14 has the same information as that of the tag LR index shown in the first embodiment with reference to FIG. 12.

The conversion means 20 is called up by the management means 21 to receive an input of a tag LR document list and to output an L index and an R index.

The management means 21 has a management table therein. The management table is a table that stores the relation of a tag name with the frequency of the tag in a document and an index type. The index type indicates a place where an index of the tag in question is created, and takes one of a value "NLR", which means that the index is in the tag NLR index storing unit 18, and a value "LR", which means that the index is in the tag LR index storing unit 14.

FIG. 32 illustrates an example of the management table. This example shows that a [person's name] tag appears 100,001 times within a document set, and that its index is currently stored in the tag NLR index storing unit 18.

The management means 21 receives an input of data (statement) that contains a command type, a tag name, a document number, a start point, an end point, a left-hand side word, and a right-hand side word. Based on the tag name, the management means 21 refers to the management table to fetch an index type that is associated with the tag name, and inputs the input statement to a relevant index as it is. The management means 21 receives an inquiry that has a reference key and a reference destination as an input, uses a tag name in the reference key to refer to the management table and to fetch an index type that is associated with the tag name, and makes an inquiry to a relevant index. The management means 21 also checks tag frequencies and index types in the management table at arbitrary timing. When there is a tag name whose tag frequency is larger than a threshold a and whose index type is "NLR", a tag LR document list that is associated with this tag name is read out of the tag NLR index storing unit 18 to create a tag L index and a tag R index with the use of the conversion means 20. The created indices are added to the tag LR index storing unit 14. The threshold a is an arbitrary fixed number.

The processing flow in this embodiment is described next. This embodiment has mainly three processes, a search process, a tag update process, and a document index process. Those processes are equivalent to what is obtained by replacing the operation of the tag LR index storing unit 14 in the first to third embodiments with that of the tag management unit 19. Accordingly, processing within the tag management unit 19 alone is discussed here, and a description is given on a process of updating a tag in the tag management unit 19, a process of making an inquiry to the tag management unit 19, and an index optimizing process.

The process of updating a tag in the tag management unit 19 is described first. The tag update process is started when the tag update unit 12 inputs a statement concerning the addition or removal of a tag to the management unit 19. Then, the system first refers to the management table based on the tag name and updates a frequency that is associated with the tag name. The frequency is updated as follows. When the command type in the statement is addition, 1 is added to the frequency and 1 is subtracted from the frequency when the command type is removal.

The system next uses the tag name to refer to the management table and fetch a relevant index type. When the index type is LR, the system gives the statement to the tag LR index storing unit 14 and executes the processing of Steps S21 and S22. When the index type is NLR, the system processes as follows. The system reads a tag LR document list with the input tag name as a key and, when the command type is addition, adds the document number, the start point, the end point, the left-hand side word, and the right-hand side word to the tag LR document list. When the command type is removal, the tag LR document list is searched for a part whose document number, start point, and end point match those in the statement, and the part is deleted.

The process of making an inquiry to the tag management unit 19 is described next. This process is started when the inquiry executing means 152 makes an inquiry to the tag management unit 19 with a reference key and a reference destination as an input.

Then, the system first refers to the management table based on the tag name and fetches a relevant index type. When the index type is LR, an inquiry is made to the tag LR index storing unit 14. This inquiry processing is the same as the inquiry to the tag LR index storing unit 14 in the first embodiment.

Figure 33:
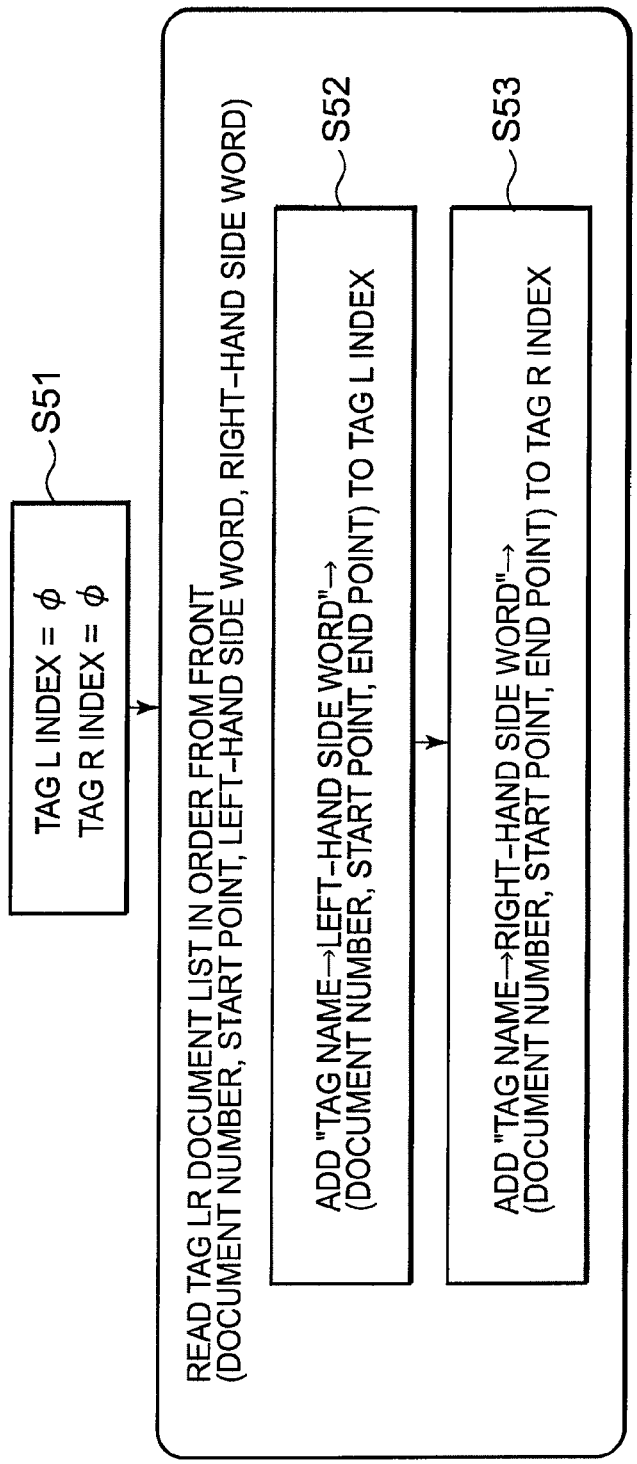
FIG. 33 is a flow chart of processing executed when an index type is NLR.

FIG. 33 is a flow chart of processing that is executed when the index type is NLR. When the index type is NLR, the system uses a tag name contained in the reference key in the inquiry to read an associated tag LR document list, and uses the conversion means 220 to create a tag L index and a tag R index.

Specifically, the system first creates a null tag L index and a null tag R index in a location where a quick addition or reference to the indices is possible, such as a memory in the computer (S51).

The system next examines the tag LR index in order from the front and, each time five pieces of data consisting of a document number, a start point, an end point, a left-hand side word, and a right-hand side word are read, performs the following processing. The system checks whether there is a tag document list that has a "tag name→left-hand side word" key in the tag L index and, when there is, adds the document number, the start point, and the end point to the tail end of the tag document list. When there is not, a tag document list is newly created based on the document number, the start point, and the end point, and registered with the "tag name→left-hand side word" key. The same processing is performed on the tag R index to add the document number, the start point, and the end point to the tag R index with a key "tag name→right-hand side word" (S52).

After that, when the reference key is "tag name", a right-hand side-word list/left-hand side-word list is returned and, when the reference key is "tag name→word", a relevant position in a relevant tag L index/tag R index is referred to and a tag document list is returned (S53).

Figure 34:
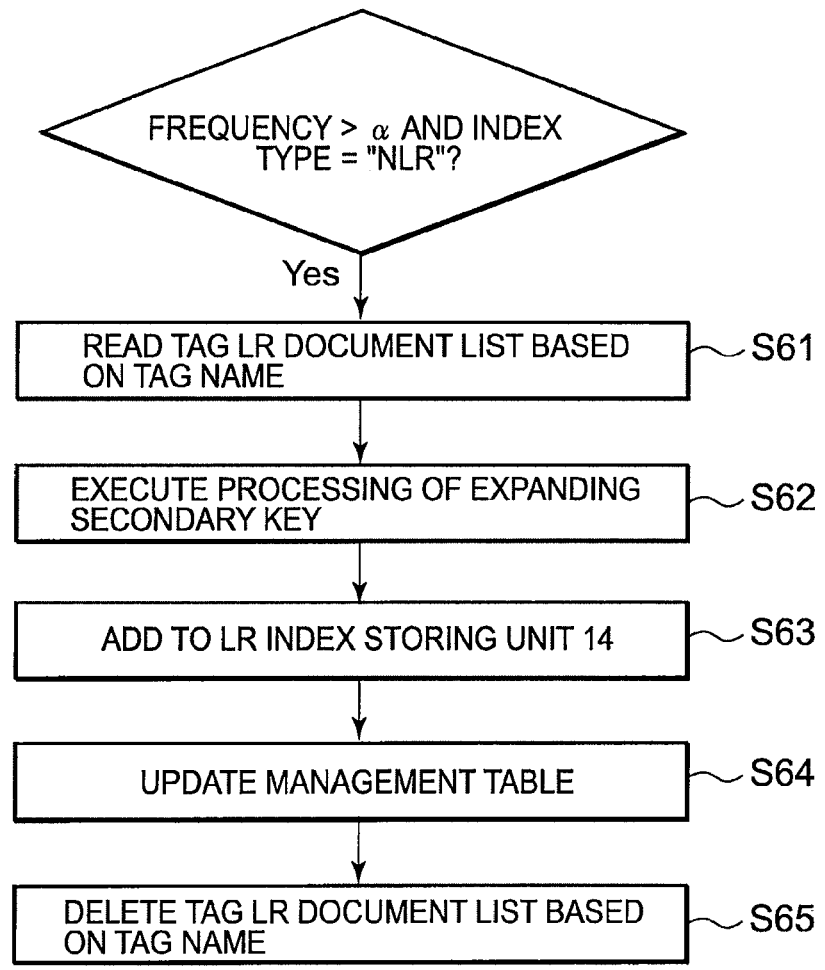
FIG. 34 is a flow chart of an index optimizing process.

FIG. 34 is a flow chart of the index optimizing process. The index optimizing process uses as an input one row of data (tag name, frequency, and index type) in the management table, and is executed at arbitrary timing. For instance, the execution timing may be such that the index optimizing process is executed after the process of updating a tag in the tag management unit 19 is finished for a row in the management table that has been updated through the tag update process, or such that the index optimizing process is executed for all rows at 3:00 A.M. every day.

When the index optimizing process is started, the system checks the frequency and the index type. When the frequency is equal to or larger than the threshold a and the index type is "NLR", the management means 21 examines the tag NLR index storing unit 18 to read a tag LR document list that is associated with this tag name (S61). The management means 21 next uses the conversion means 20 to create from this tag LR document list a tag L index and a tag R index (S62). The management means 21 then adds the created tag L index and tag R index to the tag LR index storing unit 14 (S63). Next, the management means 21 uses the same tag to refer to the management table and updates the index type to "LR" (S64). Lastly, the management means 21 deletes the tag LR document list and the key from an index in the tag NLR index storing unit 18 that is associated with this tag name (S65).

While the above-mentioned algorithm changes the storage location of an index based on the frequency of the tag, there are other conceivable determination standards such as the number of different types of left-hand side word, the number of different types of right-hand side word, the number of times an inquiry is made with respect to a tag, and a number calculated by combining those.

The operation of this embodiment is described next through a concrete example. The description given here is about the index optimizing process.

Focus on, for example, the "person's name" tag row in the management table illustrated in FIG. 32 and consider a case where the threshold a is 100,000. The index optimizing process in this case operates as follows. The management means 21 first checks the frequency and the index type. Because the tag frequency exceeds the threshold and the index type is "NLR", the management means 21 makes an inquiry to the tag NLR index storing unit 18 to obtain the tag LR document list of FIG. 31 which has "person's name" as a key (S61). The management means 21 uses the conversion means 20 to create from the tag LR document list a tag L index and a tag R index, thereby obtaining the index shown in FIG. 12 (S62), and stores the index in the tag LR index storing unit 14 (S63). The management means 21 then changes the index type associated with "person's name" in the management table of FIG. 32 to "LR" (S64), and deletes this tag LR document list and the "person's name" key from the tag NLR index storing unit 18 (S65).

In this embodiment, a tag NLR index and a tag LR index are thus switched based on statistical information of a tag. A tag LR index, which has a document list for a left-hand side word and a document list for a right-hand side word, is fast but, because indices are created for both directions, has redundancy and stores a large amount of data. Therefore, for a tag that originally has a short frequency and appears infrequently keeping the size of a document list read in a search small, a tag NLR index is used to make the index small and thereby balance the data amount and the enhancement of search speed. In other words, creating an LR index for a tag that originally has a short document list and is low in frequency can be avoided, with the result that the high speed of a search is maintained while reducing the amount of data kept as an index.

Fifth Embodiment

This invention can be embodied as a computer program, and may be distributed via a storage medium or a network.

This computer program includes codes for causing a computer to execute: document index creating processing in which, when one or more documents are given, appearance positions of each word contained in the documents are stored with the word as a key; tag update processing in which, when a query for adding or removing a tag to or from a partial character string in a specific document is given, appearance positions of the tag are stored with the tag name as a key; tag LR storing processing in which, for the tag input during the tag update processing, words that appear to the right and left of the tag are stored, and appearance positions of each tag in a document set are stored with a combination of the tag and a word to its right, or a combination of the tag and a word to its left, as a key; and document retrieval processing in which, when a phrase containing a tag and a word is given as a search query, the search query is interpreted to create a plurality of keys by utilizing left-right relations between neighboring words and tags in the phrase, those keys are used to integrate appearance positions of words which are referred to with the use of the keys stored in the document index creating processing and appearance positions of each tag which are referred to with the use of the keys stored in the tag update processing, and a list of the identifiers of documents that contain the phrase is returned.

Desirably, the computer program further includes codes for causing a computer to execute: quick tag value determining processing which uses an arbitrary character string as a key and enables a quick reference to a set of tag names that may be attached to the character string; processing of updating data that indicates a relation between a tag name and a character string when a tag is attached in the tag update processing; and processing in which, when a phrase where tag names appear in succession is input as a search query in the document retrieval processing, the quick tag value determining processing is utilized to read tag appearance positions only for words that may contain a specific tag name.

The computer program may further include codes for causing a computer to execute: bit string storing processing in which, in the document index processing, a high-frequency word and a tag name are used as keys to store a bit string representing a set of documents that contain the word and a bit string representing a set of documents that contain the tag; processing of updating a bit string that has been stored in the bit string storing processing based on a tag that has been added or removed when a tag has been updated in the tag update processing; and processing in which bit strings that have been stored in the bit string storing processing with a high-frequency word and tag name contained in a search query as keys are referred to in the document retrieval processing, to thereby obtain data representing a set of documents that contain all high-frequency words and tag names in the query, and appearance positions of words and tags are read after a set of documents is narrowed down based on this data.

The computer program may include codes for causing a computer to execute tag NLR index processing in the tag update processing to store, for each tag name in a set of tags, appearance positions of the tag in a document set and words to the left and right of the tag, with the tag name as a key, and for causing the computer to execute: processing in which, when an appearance position of a tag is updated or searched for in the tag update step or the document search step with the tag as a key, a reference destination is selected depending on whether the tag has been stored in the tag NLR index processing or stored in the tag LR update processing; and index conversion processing in which, based on a frequency related to a tag, data created through the tag NLR index processing is deleted and newly created through the tag LR index processing.

This invention is effective as a part of a system that uses a tag to manage and retrieve documents. This invention focuses on a part that, based on a phrase containing a tag, quickly determines a list of document numbers which represents a set of documents containing the phrase. Accordingly, if a document database that uses a document number to refer to its document itself is prepared in addition to the configuration of this invention, the resultant system can be utilized as a search engine capable of reading a set of documents with the use of a phrase containing a tag.

This invention is a technology with which search by phrase containing a tag is accomplished while updating a tag is taken into account. Applications where this technology is in need include the field of text mining which involves analyzing a large set of documents. In text mining, a tag is attached to a document and analysis is performed by utilizing the tag. Usually, what tagging is favorable for a set of documents is unknown beforehand. An efficient way to extract information from a set of documents is therefore to index a large set of documents in advance, perform tagging with the use of various tagging measures, search by tag or search by phrase containing the tag, and fetch the frequency and document set of the tag. This invention is useful in such cases.

This application claims priority from Japanese Unexamined Patent Application (JP) No. 2007-296386, filed on Nov. 15, 2007, the entire disclosure of which is incorporated herein by reference.

The invention claimed is:

1. A document management and retrieval system, comprising:
  (a) one or more processors; and
  (b) a non-transitory storage medium coupled to the one or more processors and containing instructions executable by the one or more processors such that when the instructions are executed on the one or more processors, one or more of the processors will:
    store appearance positions for a plurality of words in one or more of a plurality of documents in a word index store;
    store a plurality of tag indexes and an appearance position of the character string associated with each tag in a set of documents in a tag index store, each tag index being associated with a respective character string and comprising:
      a tag associated with its respective character string in one of the plurality of documents, the tag having a name and indicating attributes of the character string based upon the meaning of the character string;

at least one of a right word string comprising one or more adjacent words that appears to the right of its respective character string and a left word string comprising one or more adjacent words that appears to the left of its respective character string;

a combination of the tag with at least one of the left and right word strings; and operate as a document retrieval unit that receives as a search query an input of a phrase containing a search tag name and a search word, and returns a list of identified documents that contain the phrase by utilizing the combination entries stored in the tag index store;

operate as a tag update unit that interprets a query for associating or disassociating a tag to or from a character string in a document and updates the associated tag index stored in the tag index store; and operate as a document index creating unit that updates a word index within the word index store when one or more documents are identified; and (c) a bit string store that stores a plurality of a bit strings, each bit string representing a set of documents of the plurality of documents that contain a high-frequency word or a set of documents that contain a specified tag, wherein:

the tag update unit updating a bit string in the bit string store when a tag is associated or disassociated to or from a character string in a document; and the document retrieval unit using the high-frequency word and tag name contained in a query to refer to the bit string store prior to a search and to obtain a set of documents that contain all high-frequency words and tag names in the query.

2. The document management and retrieval system according to claim 1, further comprising a quick tag value determining unit that uses an arbitrary character string to enable quick reference to a set of tag names associated with the arbitrary character string, wherein:

the tag update unit includes means for updating data in the quick tag value determining unit when a tag is associated with its respective character string; and the document retrieval unit includes means for referring to the quick tag value determining unit and the tag index store to execute a search when a phrase containing search tag names that appear in succession is input as a search query.

3. The document management and retrieval system of claim 1, wherein the attribute indicated by at least one of the tags is one of a person's name, a company name and a location name.

4. The document management and retrieval system of claim 1, wherein the attribute indicated by at least one of the tags is a type of word class.

5. A document management and retrieval system, comprising:

(a) one or more processors; and (b) a non-transitory storage medium coupled to the one or more processors and containing instructions executable by the one or more processors such that when the instructions are executed on the one or more processors, one or more of the processors will:

store appearance positions for a plurality of words in one or more of a plurality of documents in a word index store;

store a plurality of tag indexes and an appearance position of the character string associated with each tag in a set of documents in a tag index store, each tag index being associated with a respective character string and comprising:

a tag associated with its respective character string in one of the plurality of documents, the tag having a name and indicating attributes of the character strings based upon the meaning of the character string;

at least one of a right word string comprising one or more adjacent words that appears to the right of its respective character string and a left word string comprising one or more adjacent words that appears to the left of its respective character string;

a combination of the tag with at least one of the left and right word strings; and receive as a search query an input of a phrase containing a search tag name and search word, and return a list of identified documents that contain the phrase by utilizing the combination entries stored in the tag index store;

store appearance positions for a plurality of tags in a set of documents along with the appearance positions of the left and/or right word strings associated with the respective tag in the tag index store;

update a word index within the work index store when one or more documents are identified;

interpret a query for associating or disassociating a tag to or from a character string in a document and updates the associated tag index stored in the tag index store;

convert a first index within the tag index store into a second index within the tag index store; and change how an index is stored based on an appearance frequency of the tag.

6. A document management and retrieval method, comprising:

a document index creating step of storing appearance positions of a plurality of words contained in one or more of a plurality of documents;

a tag storing step of storing a plurality of tag indexes and an appearance position of each tag in a set of documents of the plurality of documents, each tag index being associated with a respective character string and comprising:

a tag associated with its respective character string in one of the plurality of documents, the tag having a tag name and indicating attributes of the character string based upon the meaning of the character string;

at least one of a right word string comprising one or more adjacent words that appears to the right of its respective character string and a left word string comprising one or more adjacent words that appears to the left of its respective character string;

a combination of the tag with at least one of the left and right word strings; and storing an appearance position of the character string associated with each tag in a set of documents of the plurality of documents;

a document retrieval step of receiving as a search query an input of a phrase containing a search tag name and a search word, and returning a list of identified documents that contain the phrase by utilizing the combination entries stored in the tag index store; and using a high-frequency word and a tag name to store a bit string representing a set of documents that contain the high-frequency word and a bit string representing a set of documents that contain a tag, wherein:

the tag update step includes updating a bit string in a bit string store based on a tag that has been added or removed through a tag update; and the document retrieval step includes referring to bit strings that have been stored in the bit string storing step with a high-frequency word and tag name contained in the search query, obtaining data representing a set of documents that contain all high-frequency words and tags in the search query, and reading word appearance positions and tag appearance positions in the set of documents of the plurality of documents.

7. The document management and retrieval method according to claim 6, further using an arbitrary character string and enabling a quick reference to a set of tag names that may be attached to the arbitrary character string, wherein:

the tag update step includes updating data that represents a relation between a tag name and a character string when a tag is to be attached; and the document retrieval step includes utilizing the quick tag value determining step when a phrase where tag names appear in succession is input as a search query, to read tag appearance positions only for words that contain a specific tag name.

8. The document management and retrieval method of claim 6, wherein the attribute indicated by at least one of the tags is one of a person's name, a company name and a location name.

9. The document management and retrieval method of claim 6, wherein the attribute indicated by at least one of the tags is a type of word class.

10. A document management and retrieval method, comprising:

a document index creating step of storing appearance positions of a plurality of words contained in one or more of a plurality of documents;

a tag storing step of storing a plurality of tag indexes and an appearance position of the character string associated with each tag in a set of documents of the plurality of documents, each tag index being associated with a respective character string and comprising:

a tag associated with its respective character string in one of the plurality of documents, the tag having a tag name and indicating attributes of the character string based upon the meaning of the character string;

at least one of a right word string comprising one or more adjacent words that appears to the right of its respective character string and a left word string comprising one or more adjacent words that appears to the left of its respective character string, and a combination of the tag with at least one of the left and right word strings;

a document retrieval step of receiving as a search query an input of a phrase containing a search tag name and a search word, and returning a list of identified documents that contain the phrase by utilizing the combination entries stored in the tag index store;

a tag update step including storing, appearance positions for a plurality of tags in a set of documents along with the appearance positions of at least one of the left and/or right work string-associated with the respective tag; and the tag update step and the document retrieval step including selecting a reference destination when an appearance position of a tag is updated or searched for with the tag name as a key, depending on whether the tag has been stored in the tag index step or in the tag update step.

11. A non-transitory computer-readable medium that causes a computer to execute:

storing appearance positions of a plurality of words contained in one or more of a plurality of documents;

storing a plurality of tag indexes and an appearance position of the each tag in a set of documents of the plurality of documents, each tag index being associated with a respective character string and comprising:

a tag associated with its respective character string in one of the plurality of documents, the tag having a name and indicating attributes of the character string based upon the meaning of the character string;

at least one of a right word string comprising one or more adjacent words that appears to the right of its respective character string and a left word string comprising one or more adjacent words that appears to the left of its respective character string; and a combination of the tag with at least one of the left and right word strings; and receiving as a search query an input of a phrase containing a search tag name and a search word and returning a list of identified documents that contain the phrase by utilizing the combination entries stored in the tag index store;

using a high-frequency word and a tag name to store a bit string representing a set of documents that contain the high-frequency word and a bit string representing a set of documents that contain a tag;

updating a bit string stored in the bit string store based on a tag that has been added or removed through a tag update; and referring to bit strings that have been stored in the bit string store with a high-frequency word and tag name contained in the search query obtaining data representing a set of documents that contain all high-frequency words and tag names in the search query, and reading word appearance positions and tag appearance positions in a set of documents.

12. The non-transitory computer-readable medium according to claim 11, further causing the computer to execute:

using an arbitrary character string to quickly refer to a set of tag names that may be attached to the character string;

updating data that represents a relation between a tag name and a character string when a tag is to be attached; and utilizing the quick tag value determining processing when a phrase where tag names appear in succession is input as a search query, to read tag appearance positions only for words that may contain a specific tag name.

13. The non-transitory computer-readable medium of claim 11, wherein the attribute indicated by at least one of the tags is one of a person's name, a company name and a location name.

14. The non-transitory computer-readable medium of claim 11, wherein the attribute indicated by at least one of the tags is a type of word class.

15. A non-transitory computer-readable medium that causes a computer to execute:
- storing appearance positions of a plurality of words contained in one or more of a plurality of documents;
- storing a plurality of tag indexes and an appearance position of the each tag in a set of documents, each tag index being associated with a respective character string and comprising:
  - a tag associated with its respective character string in one of the plurality of documents, the tag having a name and indicating attributes of the character string based upon the meaning of the character string;
  - at least one of a right word string comprising one or more adjacent words that appears to the right of its respective character string and a left word string comprising one or more adjacent words that appears to the left of its respective character string;
  - a combination of the tag with at least one of the left and right word strings; and
- receiving as a search query an input of a phrase containing a search tag name and a search word, and returning a list of identified documents that contain the phrase by utilizing the combination entries stored in the tag index store;
- storing appearance positions of a plurality of tags in a set of documents along with the appearance positions of the left and/or right hand word strings associated with the respective tag; and
- in the tag update step and the document retrieval step:
  - selecting a reference destination when an appearance position of a tag is updated or searched, depending on whether the tag has been stored in the tag index processing or in the tag update processing; and
  - deleting data that has been created in the tag index processing and creating data in tag index processing based on a frequency related to a tag.

* * * * *